US006263202B1

(12) United States Patent
Kato et al.

(10) Patent No.: US 6,263,202 B1
(45) Date of Patent: Jul. 17, 2001

(54) COMMUNICATION SYSTEM AND WIRELESS COMMUNICATION TERMINAL DEVICE USED THEREIN

(75) Inventors: Shuzo Kato; Isao Okazaki, both of Tokyo (JP)

(73) Assignee: Uniden Corporation, Tokyo (JP)

( * ) Notice: Subject to any disclaimer, the term of this patent is extended or adjusted under 35 U.S.C. 154(b) by 0 days.

(21) Appl. No.: 09/100,027

(22) Filed: Jun. 19, 1998

(30) Foreign Application Priority Data

Jan. 28, 1998 (JP) .................................................. 10-015916

(51) Int. Cl.$^7$ .................................................. H04M 3/00
(52) U.S. Cl. .......................... 455/418; 455/90; 455/552; 455/553; 455/556; 704/246
(58) Field of Search .................................. 455/414, 403, 455/407, 425, 1, 90, 552, 553, 556, 557, 418; 709/200, 201, 233, 246

(56) References Cited

U.S. PATENT DOCUMENTS 5,479,472 * 12/1995 Campana Jr. et al. ............... 455/412
5,742,905 *  4/1998 Pepe et al. ............................ 455/461
5,928,325 *  7/1999 Shaughnessy et al. .............. 709/206

FOREIGN PATENT DOCUMENTS

| 61-138998 | 6/1986 | (JP) . |
| 2106799 | 4/1990 | (JP) . |
| 2-236600 | 9/1990 | (JP) . |
| 3-59619 | 9/1991 | (JP) . |
| 3-289854 | 12/1991 | (JP) . |
| 7-288578 | 10/1995 | (JP) . |
| 7-123267 | 12/1995 | (JP) . |
| 8-272587 | 10/1996 | (JP) . |

OTHER PUBLICATIONS

Katsunori Okamoto et al., "Acoustic Feature Extraction from Voice including Basic Emotion", Artilce No. SA–6–3 of the Institute of Electronic, Informaion and Communication Engineers of Japan Spring Congress, 1993.

* cited by examiner

Primary Examiner—Lee Nguyen
(74) Attorney, Agent, or Firm—McDermott, Will & Emery

(57) ABSTRACT

A communication system is provided whereby desired information can be transmitted in accordance with conditions and the application. The communication system includes a PHS terminal and a provider system that is capable of information communication with this terminal. The PHS terminal has a voice recognition section that receives voice from a microphone and recognises the received voice signal, an input device that selects the output form of the voice signal, a conversion section that converts the recognised voice signal with the selected output form, and a transceiver that transmits the converted voice signal to the provider equipment; the converted voice signal is further transferred from the provider system to another destination wireless communication terminal device. This output form includes for example "dialect", "intonation/imitated voice of a celebrity etc." or "modulation". Conversion filters convert the voice signal in accordance with these.

16 Claims, 21 Drawing Sheets

CASE WHERE MESSAGE IS REPRODUCED BY VOICE

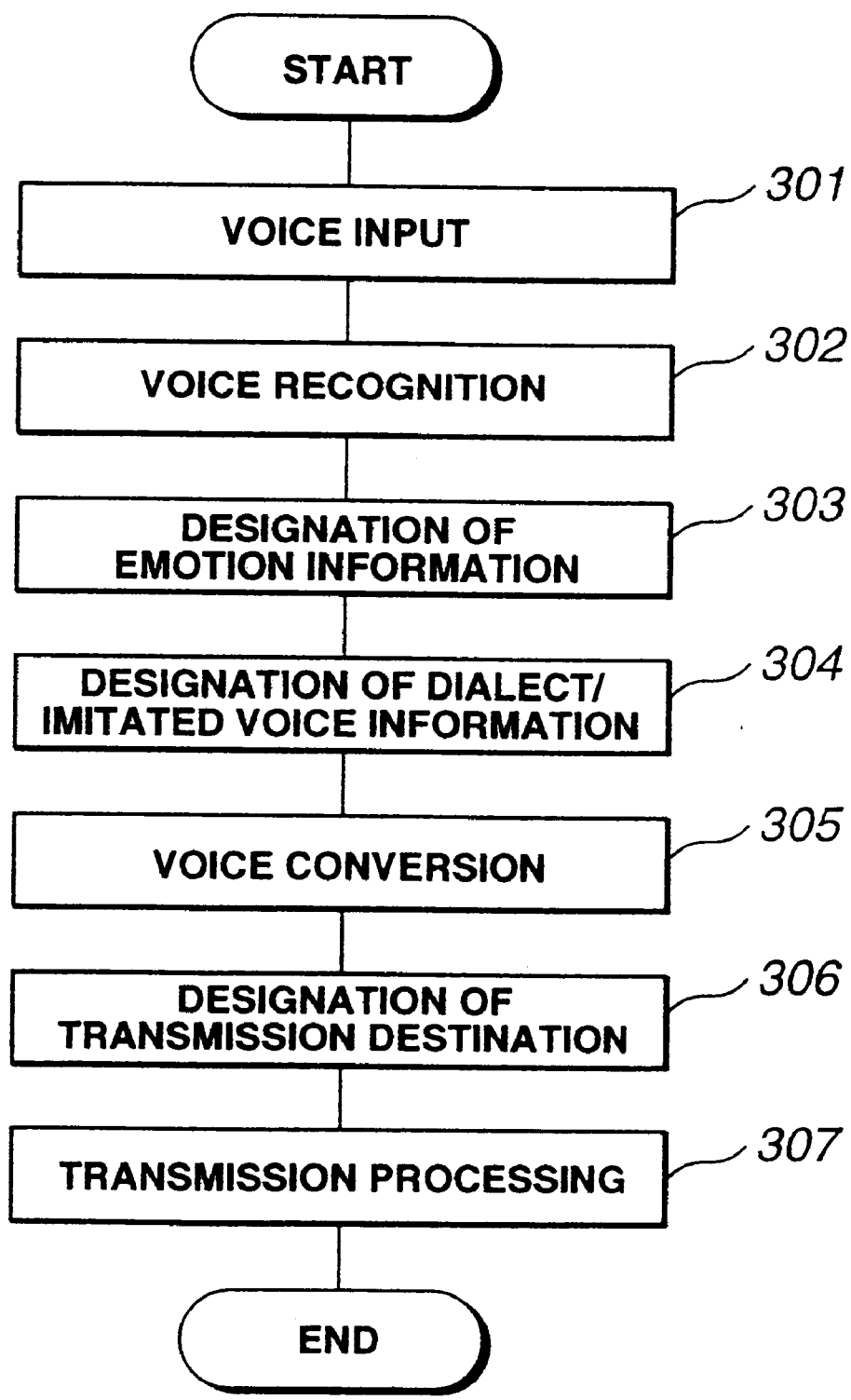

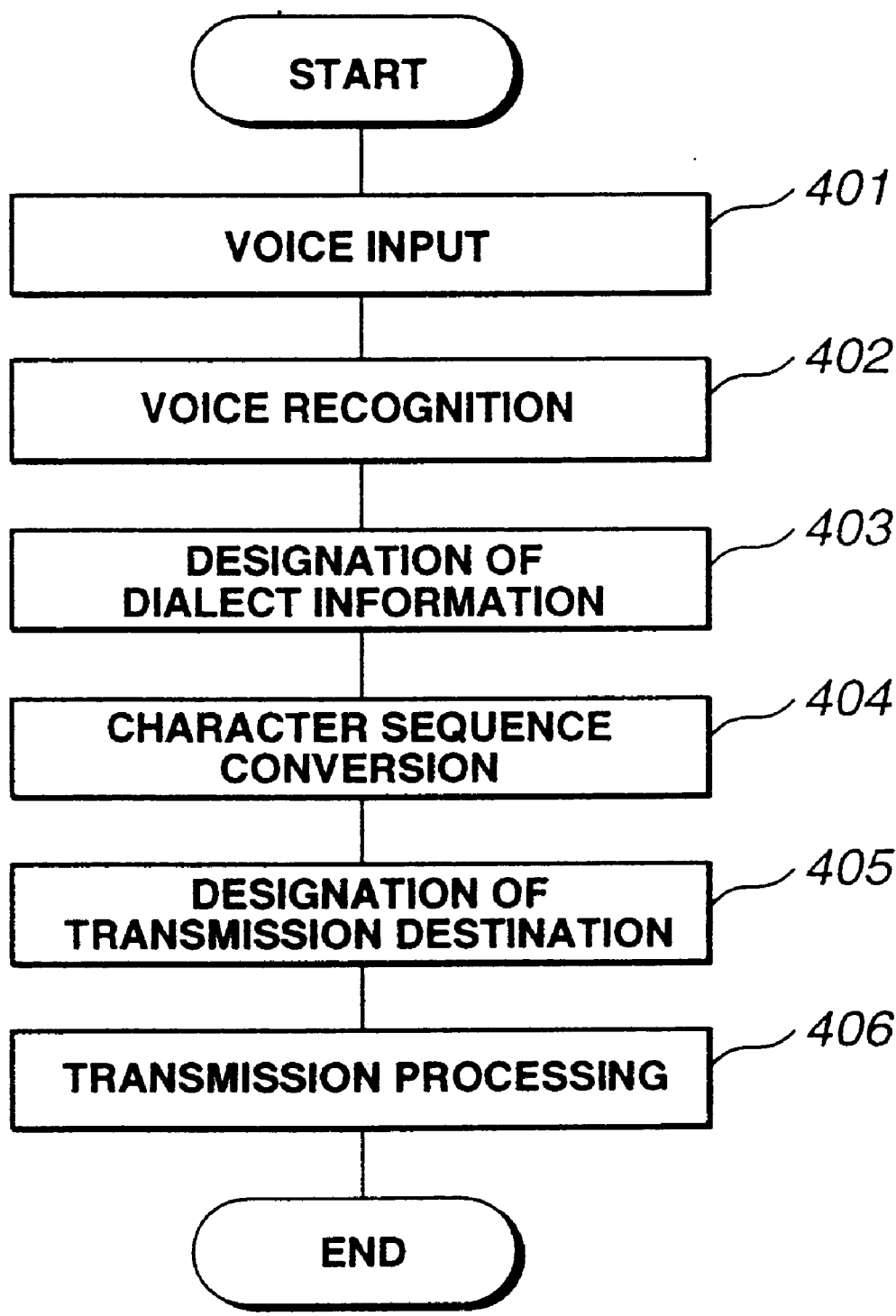

FIG.8

CONTENT OF ELECTRONIC MAIL SENT
FROM PHS TERMINAL TO MAIL SERVER 1

```
To : vmail@mail.vuni.ne.jp
From : phsl@vuni.ne.jp
user=isao
pass=xxxx
type1=voice
type2=kitty
number=035541yyyy
password=xxxx
message= THE WEATHER IS FINE TODAY ISN'T IT?
priority=1
data1=anger
data2=kansai
time=09131000
mail1=aaa@bbb.ccc.co.jp
mail2=aaa@bbb.ccc.co.jp
```

FIG.9

CONTENT OF ELECTRONIC MAIL FROM MAIL SEVER 1
WHEN MESSAGE IS REPRODUCED BY VOICE

```
To : vmail@telgw.vuni.ne.jp
From : phsl@mail.vuni.ne.jp
user=isao
pass=xxxx
type1=voice
type2=kitty
number=035541yyyy
password=
message= THE WEATHER IS FINE TODAY ISN'T IT?
priority=1
data1=anger
data2=kansai
time=09131000
mail1=aaa@bbb.ccc.co.jp
mail2=aaa@bbb.ccc.co.jp
```

FIG.10

CONTENT OF ELECTRONIC MAIL FROM MAIL SERVER 1
WHEN MESSAGE IS SENT BY ELECTRONIC MAIL

```
To : vmail@telgw.vuni.ne.jp
From : phsl@mail.vuni.ne.jp
user=isao
pass=xxxx
type1=mail
type2=
number=isao@vuni.ne.jp
password=
message=THE WEATHER IS FINE TODAY ISN'T IT?
priority=3
data1=
data2=
time=09131000
mail1=aaa@bbb.ccc.co.jp
mail2=aaa@bbb.ccc.co.jp
```

FIG.11

CONTENT OF ELECTRONIC MAIL FROM MAIL SERVER 1
WHEN MESSAGE IS SENT TO ELECTRONIC MAIL

```
To : vmail@telgw.vuni.ne.jp
From : phsl@vuni.ne.jp
user=isao
pass=xxxx
type1=message
type2=info-next
number=isao@vuni.ne.jp
password=1111
message=THE WEATHER IS FINE TODAY ISN'T IT?
priority=
data1=
data2=
time=09131000
mail1=aaa@bbb.ccc.co.jp
mail2=aaa@bbb.ccc.co.jp
```

FIG.12

| TYPE 2 | CONTENT |
|---|---|
| CARTOON CHARACTER 1 | CARTOON CHARACTER 1-A : DIGITAL DATA IN RESPECT OF "A" OF CARTOON CHARACTER 1<br>CARTOON CHARACTER 1-I : DIGITAL DATA IN RESPECT OF "I" OF CARTOON CHARACTER 1<br>... |
| CARTOON CHARACTER 2 | CARTOON CHARACTER 2-A : DIGITAL DATA IN RESPECT OF "A" OF CARTOON CHARACTER 2<br>CARTOON CHARACTER 2-I : DIGITAL DATA IN RESPECT OF "I" OF CARTOON CHARACTER 2<br>... |
| OWN VOICE | OWN VOICE-A : DITIGAL DATA IN RESPECT OF "A" OF OWN VOICE<br>OWN VOICE-I : DITIGAL DATA IN RESPECT OF "I" OF OWN VOICE<br>... |

FIG.15

 WHEN (2) VOICE IS SELECTED

P6

PLEASE SELECT FROM THE FOLLOWING.

| EMOTION | ○ NORMAL | ○ ANGER | ○ JOY | ○ SADNESS | ○ THREAT | ○ FEAR |
|---|---|---|---|---|---|---|
| TONE COLOUR | ○ NORMAL | ○ TONE COLOUR 1 | ○ TONE COLOUR 2 | ○ TONE COLOUR 3 | ○ TONE COLOUR 4 | |
| LANGUAGE/ DIALECT | ○ NORMAL | ○ ENGLISH | ○ CHINESE | ○ TOHOKU DIALECT | ○ KANSAI DIALECT | |

[ NEXT ]   [ TO PREVIOUS PAGE ]   [ RE-DO ]

P7

PLEASE SELECT FROM THE FOLLOWING.

| PRIORITY LEVEL | ○ 1 HIGH | ○ 2 | ○ 3 ORDINARY | ○ 4 | ○ 5 LOW |
|---|---|---|---|---|---|

PLEASE FILL IN THE FOLLOWING DETAILS

TRANSMISSION DESTINATION NUMBER [            ]

PASSWORD [            ] (IF REQUIRED)

DATE AND TIME FOR TRANSMISSION  [ ]MONTH [ ]DAY [ ]HOURS [ ]MINUTES   (IF THESE ARE NOT COMPLETED, THE MESSAGE WILL BE SENT IMMEDIATELY)

NOTIFICATION OF SUCCESS [            ]

NOTIFICATION OF FAILURE [            ]

[ TRANMITTE ]   [ TO PREVIOUS PAGE ]   [ RE-DO ]

FIG.16

③ WHEN (3) ELECTRONIC MAIL/ FAX IS SELECTED

↓

P8

PLEASE SELECT FROM THE FOLLOWING.

EMOTION   ○ NORMAL   ○ ANGER   ○ JOY   ○ SADNESS   ○ THREAT   ○ FEAR

LANGUAGE/ DIALECT   ○ NORMAL   ○ ENGLISH   ○ CHINESE   ○ TOHOKU DIALECT   ○ KANSAI DIALECT

[ NEXT ]   [ TO PREVIOUS PAGE ]   [ RE-DO ]

↓

P9

PLEASE SELECT FROM THE FOLLOWING.

PRIORITY LEVEL   ○ 1 HIGH   ○ 2   ○ 3 ORDINARY   ○ 4   ○ 5 LOW

PLEASE FILL IN THE FOLLOWING DETAILS

TRANSMISSION DESTINATION NUMBER [          ]

PASSWORD [          ] (IF REQUIRED)

DATE AND TIME FOR TRANSMISSION  [ ]MONTH [ ]DAY [ ]HOURS [ ]MINUTES  (IF THESE ARE NOT COMPLETED, THE MESSAGE WILL BE SENT IMMEDIATELY)

NOTIFICATION OF SUCCESS [          ]

NOTIFICATION OF FAILURE [          ]

[ TRANSMITTE ]   [ TO PREVIOUS PAGE ]   [ RE-DO ]

FIG.17

④ WHEN (4) CHARACTERS IS SELECTED

P10

PLEASE SELECT FROM THE FOLLOWING.

EMOTION ○ ○ ○ ○ ○ ○
NORMAL ANGER JOY SADNESS THREAT FEAR

LANGUAGE/ ○ ○ ○ ○ ○
DIALECT NORMAL ENGLISH CHINESE TOHOKU KANSAI
DIALECT DIALECT

[NEXT] [TO PREVIOUS PAGE] [RE-DO]

P11

PLEASE SELECT FROM THE FOLLOWING.

PRIORITY ○ ○ ○ ○ ○
LEVEL 1 2 3 4 5
HIGH ORDINARY LOW

PLEASE FILL IN THE FOLLOWING DETAILS

TRANSMISSION DESTINATION NUMBER [          ]

PASSWORD [          ] (IF REQUIRED)

DATE AND TIME FOR TRANSMISSION [ ]MONTH [ ]DAY [ ]HOURS [ ]MINUTES (IF THESE ARE NOT COMPLETED, THE MESSAGE WILL BE SENT IMMEDIATELY)

NOTIFICATION OF SUCCESS [          ]

NOTIFICATION OF FAILURE [          ]

[TRANSMITTE] [TO PREVIOUS PAGE] [RE-DO]

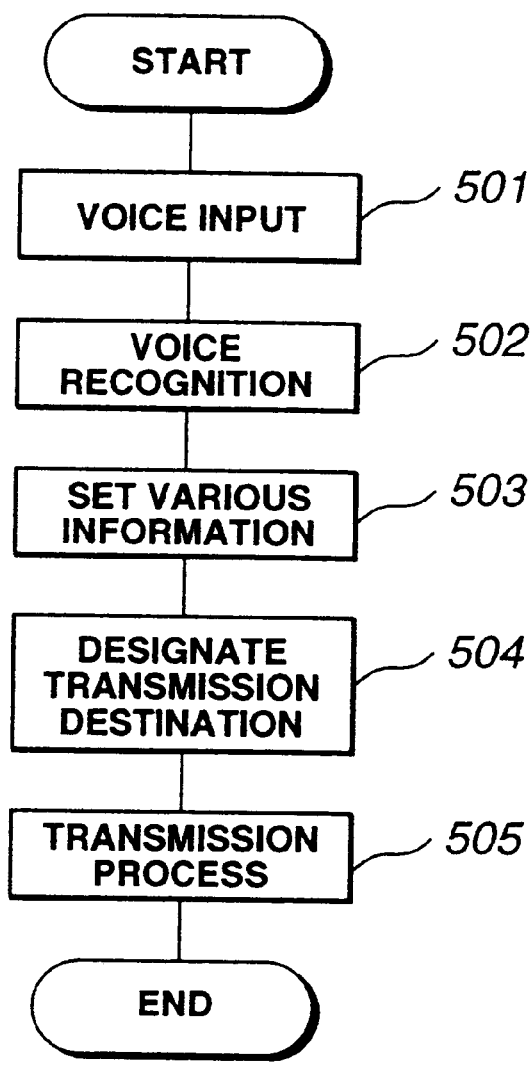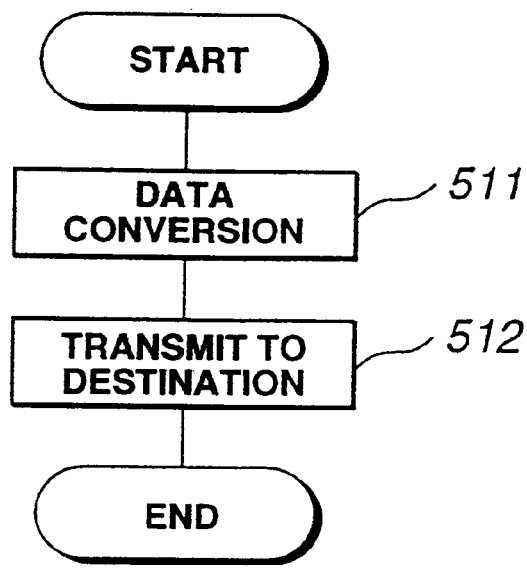

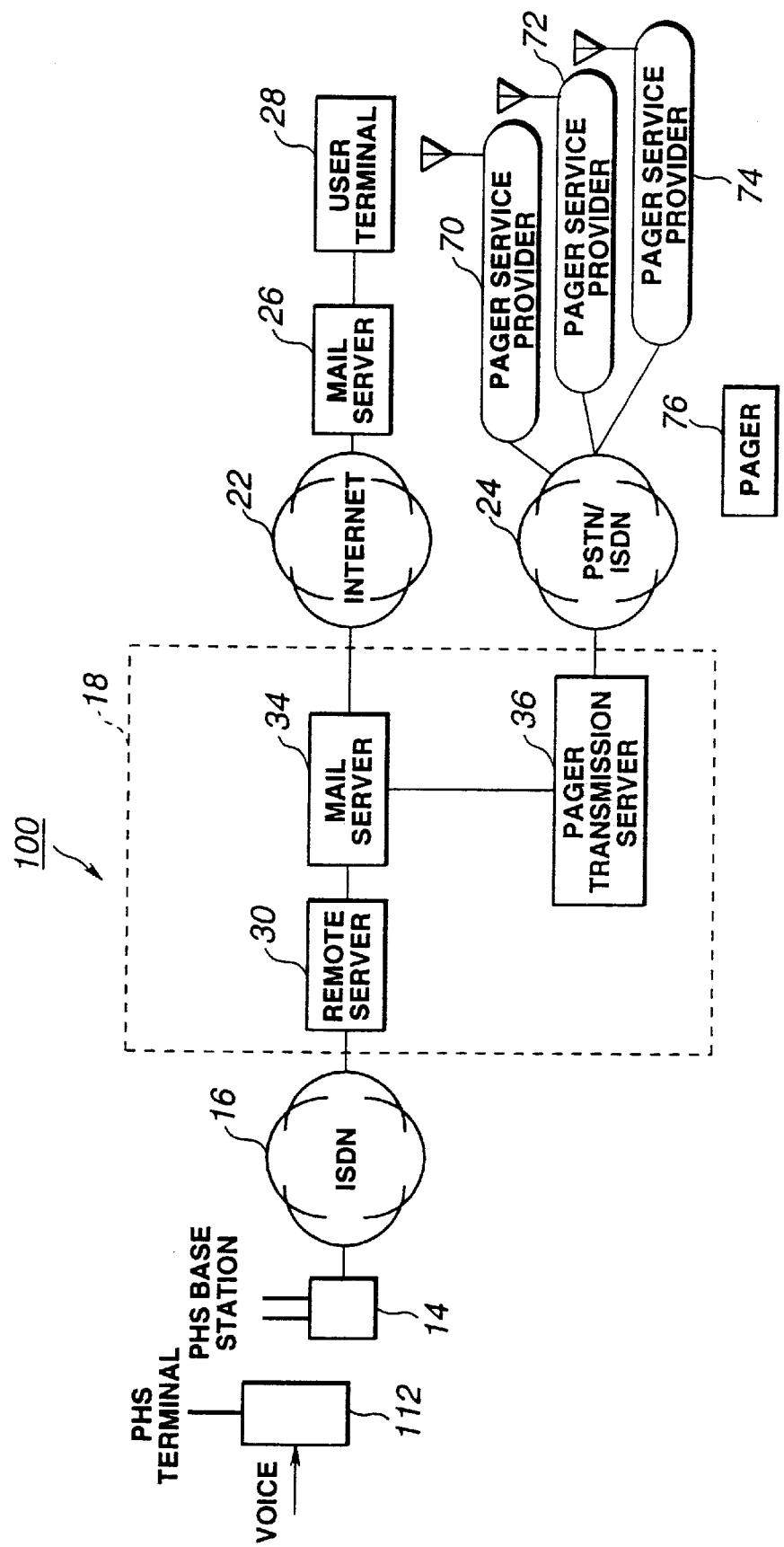

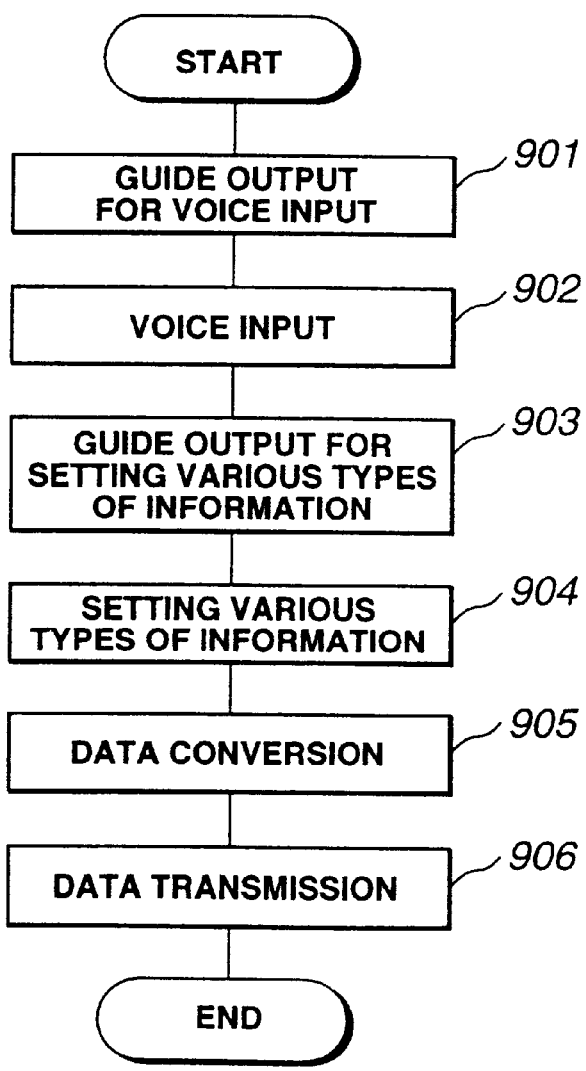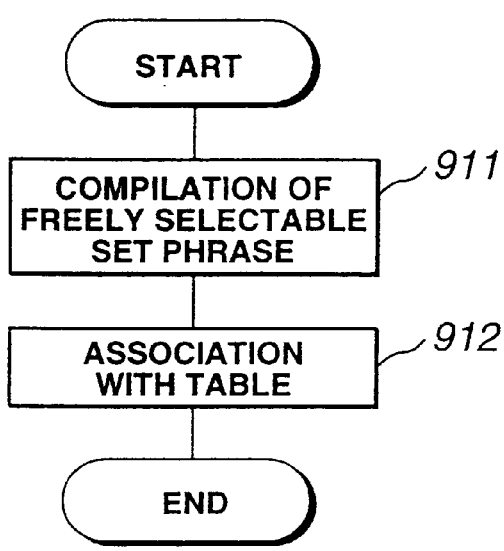

CODE CONVERSION TABLE

| CHARACTERS/ NUMERALS | SERVICE PROVIDER 1 | | | SERVICE PROVIDER 2 | | | |
|---|---|---|---|---|---|---|---|
| | DEVICE TYPE 1 | DEVICE TYPE 2 | DEVICE TYPE 3 | DEVICE TYPE 1 | DEVICE TYPE 2 | DEVICE TYPE 3 | |
| A | A11 | A12 | A13 | A21 | A22 | A23 | |
| B | B11 | B12 | B13 | B21 | B22 | B23 | |
| C | C11 | C12 | C13 | C21 | C22 | C23 | |
| ⋮ | ⋮ | ⋮ | ⋮ | ⋮ | ⋮ | ⋮ | |

COMMUNICATION SYSTEM AND WIRELESS COMMUNICATION TERMINAL DEVICE USED THEREIN

BACKGROUND OF THE INVENTION

1. Field of the Invention

The present invention relates to a communication system provided with a user terminal connected through a communication network and a transmission server that sends prescribed information to a wireless terminal such as a pager that expresses by means of characters or voice information from a user terminal.

2. Description of the Related Art

In recent years, portable wireless terminals for individual use such as portable telephones, personal handy phone systems (PHS) and pagers have become common. With such portable wireless terminals, exchange of speech or data can be performed using wireless circuits.

Furthermore, as computer communication networks typified by the Internet have become widespread, data communication between computers has become easy.

In this connection, a technique has been proposed whereby, with a portable telephone or PHS (sending-side wireless terminal), voice data or character data is sent to the server on the provider side through the Internet and this server sends prescribed information based on the voice data and/or character data that it receives to the receiving-side wireless terminal (for example, a pager). In this technique, it is desirable that the sending terminal device should be capable of transferring prescribed information to the receiving wireless terminal.

For example, in Early Japanese Patent Publication No. H.3-289854, an electronic mail system is disclosed in which a voice input mark is inserted in received mail and the received mail is read out loud at the receiving end; when the voice input mark is detected, reading out loud is interrupted, and reply information can be received by putting the voice input mechanism into operable condition. With this system, received electronic mail can be listened to by ear and a reply thereto can be input by voice, so the effort required in replying can be reduced. Also, an electronic mail system is disclosed in which, since input can be effected by voice, replies can be sent from telephones and replies from the destination are possible.

In this system, the correspondence between the message information of the electronic mail and the voice information is one-to-one and the message information is uttered by being converted for example into standard speech. Of course, with this method also, it is information that is transmitted. However, if it is sought to transmit information more precisely, the difference between character message information and voice information must be considered. Specifically, although the intention to be transmitted is expressed by the characters contained in the message information, the intention that is expressed is subtly changed by selection of voice, selection of feeling of urgency, and selection of emotional expression of mood, in addition to the characters contained in the voice of the voice information that is uttered. For example, even the same expression, which, if pronounced clearly might be rather strong, if said rather more softly, becomes a more gentle expression. Consequently, in order to accurately express the intention, it is desirable to be able to represent emotional expressions such as tone colour, feeling of urgency and mood.

Also, when information is transferred from a sending wireless terminal through the server at the provider end to another terminal, in order to compress the amount of data, it is desirable that, rather than simply sending the voice or characters without modification, it should be possible to convert the voice or characters, depending on the conditions and the application. And for example, many varieties of humorous expression are possible by using for the language, instead of standard speech, Tohoku dialect or Kansai dialect etc. or languages such as English, French, German, Russian or Chinese.

Also, it is desirable that the user should be able to receive desired information independently of the type etc. of the receiving terminal device.

Furthermore, since the performance and efficiency of processing change depending on whether the processing is performed at the terminal or the server at the provider end, a suitable apportionment of roles is necessary.

SUMMARY OF THE INVENTION

An object of the present invention is to provide a communication system and wireless communication terminal whereby intentions can be transmitted more accurately. A further object of the present invention is to provide a communication system and wireless communication terminal whereby desired information can be transferred independent of the type etc. of the receiving terminal.

A communication system according to the present invention comprises at least one wireless communication terminal device and provider equipment capable of information transmission between itself and this wireless communication terminal device wherein the wireless communication terminal device includes a transmission section that sends message information and selection information for selecting the form of output of the message information and the provider equipment includes a processing section that outputs the message information in an output form in accordance with the selection information. Intentions can be more accurately transmitted by means of the selection information.

A wireless communication terminal device according to the present invention comprises a voice identification section that identifies an input voice signal and converts it to message information and a transmission section which receives the message information and selection information for selecting the output form of the message information, and sends these.

According to the present invention, a voice signal is recognised by a wireless communication terminal and its output form is converted as desired and the converted voice signal is transferred through the provider equipment to another, destination wireless communication terminal device. In this way, sound quality of the input voice can be guaranteed since the voice is recognised by the wireless communication terminal device at the sending end; it is therefore possible to improve the voice recognition rate. Also, since conversion of the output form is performed by the wireless communication terminal device, this conversion does not require authentication by the provider equipment.

Furthermore, since conversion of the output form of the voice is performed at the wireless communication terminal device at the sending end, communication time with the provider equipment can be cut and, as a result, service charges can be reduced.

Even if, with this system, the output form conversion is effected by the provider equipment, voice recognition is performed by the wireless communication terminal device constituting the sending end. As a result, the voice recognition rate is not impaired.

A wireless communication terminal according to the present invention comprises: a voice identification section that identifies an input voice signal and converts it to message information; a table whereby a correspondence is set up between characters and numerals, and/or set phrases and a code matching the sending party; a code conversion section that refers to this table so as to be able to reproduce at the sending end the characters, numerals and/or set phrases constituting the character series of the message information and converts these to a prescribed code; and a transmission section that receives the converted code and the selection information that selects the output form of the message information and that sends these.

Further, objects of the present invention are achieved by a wireless communication terminal device comprising the above construction.

BRIEF DESCRIPTION OF THE DRAWINGS

FIG. 6 is a flow chart according to a first embodiment in voice mode showing the processing performed at the PHS terminal;

FIG. 7 is a flow chart according to a first embodiment under mail mode showing the processing performed at the PHS terminal;

FIG. 8 is an example showing the content of electronic mail sent to a mail server from a terminal;

FIG. 9 is an example of the content of electronic mail from a mail server when a message is reproduced by voice;

FIG. 10 is an example of the content of electronic mail from a mail server when a message is transferred to electronic mail;

FIG. 11 is an example showing the content of electronic mail from a mail server when a message is transferred to electronic mail;

FIG. 12 is an example of the format of tone colour recorded beforehand in the server;

FIG. 15 is an operating example (continued) in accordance with the screen of a first embodiment of the present invention;

FIG. 16 is an operating example (continued) in accordance with the screen of a first embodiment of the present invention;

FIG. 17 is an operating example (continued) in accordance with the screen of a first embodiment of the present invention;

FIG. 18 is a flow chart showing the processing executed by the PHS terminal and provider server according to a second embodiment of the present invention;

FIG. 19 is a block diagram showing the layout of a communication system according to a third embodiment of the present invention;

FIG. 22 is a flow chart showing the operation of a PHS terminal 112 according to a third embodiment; and FIG. 23 is a view given in explanation of a code conversion table in memory according to a third embodiment.

DESCRIPTION OF THE PREFERRED EMBODIMENTS

First Embodiment

1. Outline description of the system

Figure 1:
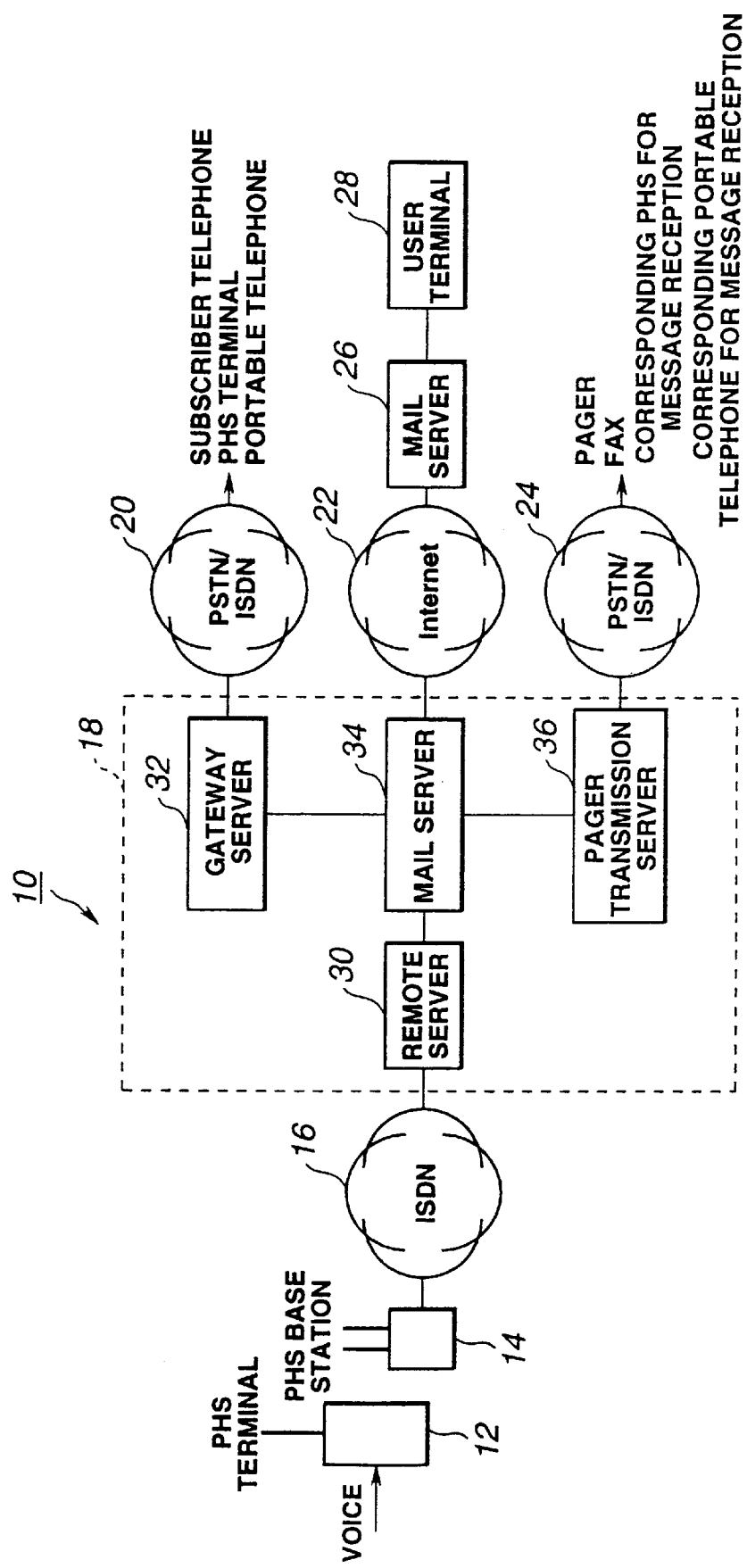
FIG. 1 is a block diagram showing the layout of a communication system according to a first embodiment of the present invention.

Embodiments of the present invention are described below with reference to the appended drawings. FIG. 1 is a block diagram showing the outline of a communication system according to a first embodiment of the present invention. As shown in FIG. 1, communication system 10 comprises: at least one PHS (Personal Handy-phone System) terminal 12; a PHS terminal station 14 that repeats a signal from PHS terminal 12; a circuit network 16 such as ISDN; a provider system 18 that sends a prescribed signal to another terminal based on a signal received through PHS base station 14 from PHS terminal 12; circuit networks 20, 22, 24 constituted by for example PSTN-ISDN or the Internet; a sending-side mail server 26; and a user terminal 28 such as a personal computer. Terminal 12 is not restricted to a PHS and could be an alternative performing the same function. Also, in FIG. 1, ISDN is employed as a circuit network 16, but there is no restriction to this. The same would apply to another circuit network.

Provider system 18 comprises: a remote server 30 connected to circuit network 16; a telephony gateway server 32 that outputs signals to a subscriber telephone, PHS terminal or portable telephone (not shown) through a circuit network 20; a mail server 34 that sends mail to a mail server 26 through a circuit network 22; and a pager transmission server 36 that sends signals indicating character series etc. to pagers, portable terminals capable of receiving messages or to a fax through a circuit network 24.

The communication system of FIG. 1 has a total of three operating modes: reproduction of a message by voice, sending of a message by characters, and sending by electronic mail. These modes are illustrated in more detail by the functional block diagrams of FIG. 2~FIG. 4.

Figure 2:
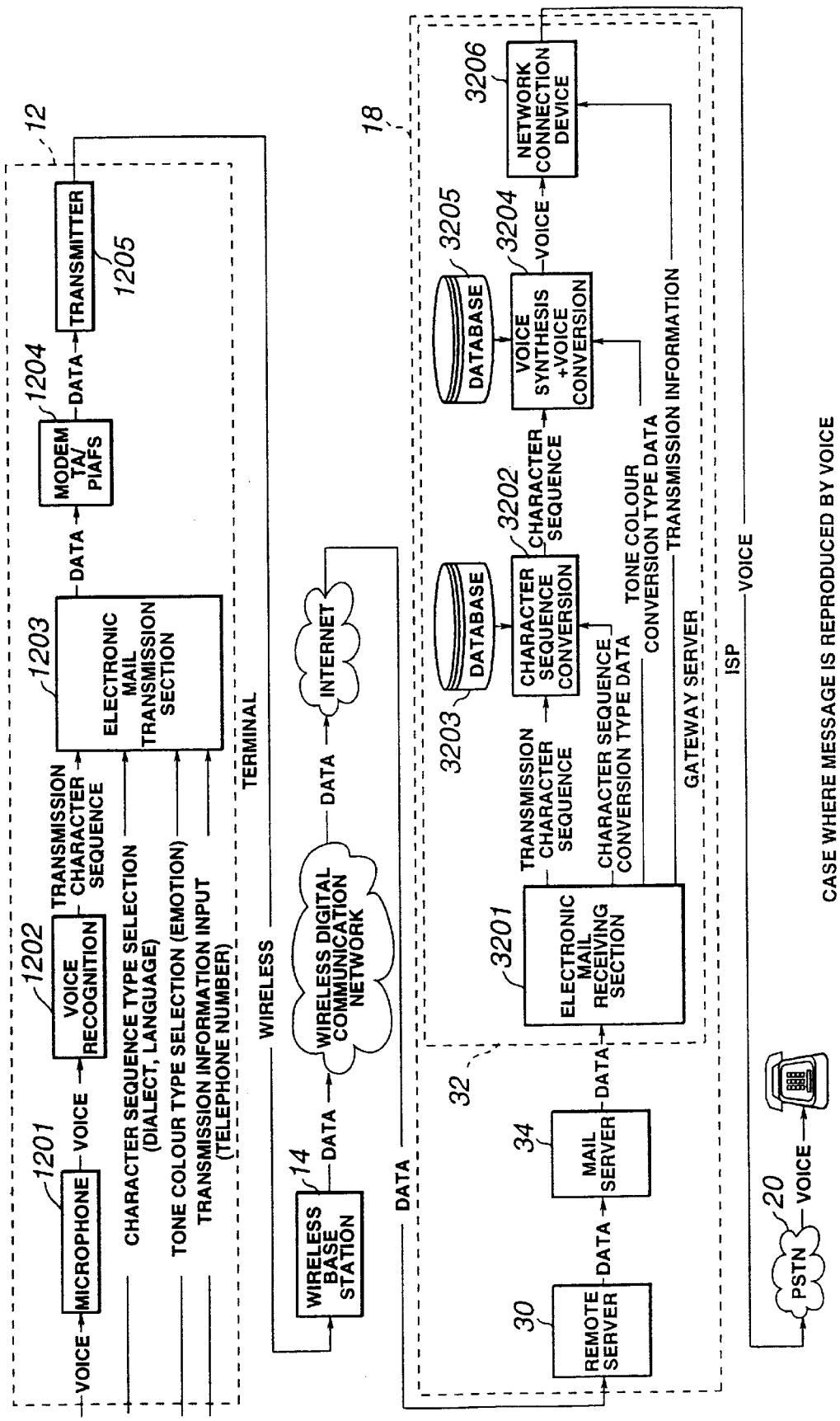
FIG. 2 is a block diagram showing the layout of a communication system according to a first embodiment of the present invention when a message is reproduced in voice.

FIG. 2 is a functional block diagram of message reproduction by voice. In FIG. 2, a voice signal converted by a microphone 1201 is converted into a transmission character sequence (message information) by voice recognition section 1202 and is then input to electronic mail transmission section 1203. Transmission information input indicating the transmission destination, such as telephone number, is also input. Selection information for selection of the output mode of the message information is also input to the transmission electronic mail sending section 1203. For example as shown in FIG. 2 this consists of character sequence type selection information for selection of the type of character sequence such as dialect or language and tone colour type selection information for selection of the type of tone colour such as emotion. These data are arranged into a prescribed format and output to a modem/TA (Terminal Adapter)/PIAFS 2104, whence they are sent through transmitter 1205.

The message information and its selection information that are received by provider system 18 through the communication network, when a message is reproduced by voice, are input to gateway server 32 through remote server 30 and mail server 34. The data received by this electronic mail receiving section 3201 is separated into transmission character sequences, character sequence conversion type data, tone colour conversion type data, and transmission information. Character series conversion section 3202 performs on the transmission character sequence a conversion specified by character series conversion type data in accordance with database 3203, for example translation from Japanese into English or conversion of standard Japanese into Kansai dialect (this will be described later). Next, voice synthesis/voice conversion section 3204 converts the data into voice signals by performing known voice synthesis on the character sequence converted in accordance with database 3205 and applies to it prescribed expression (emotional expression etc.) in accordance with the voice conversion type data (this will be described later). After this, the voice signal is sent to the indicated party through a network connection device 3206 and PSTN 20.

Figure 3:
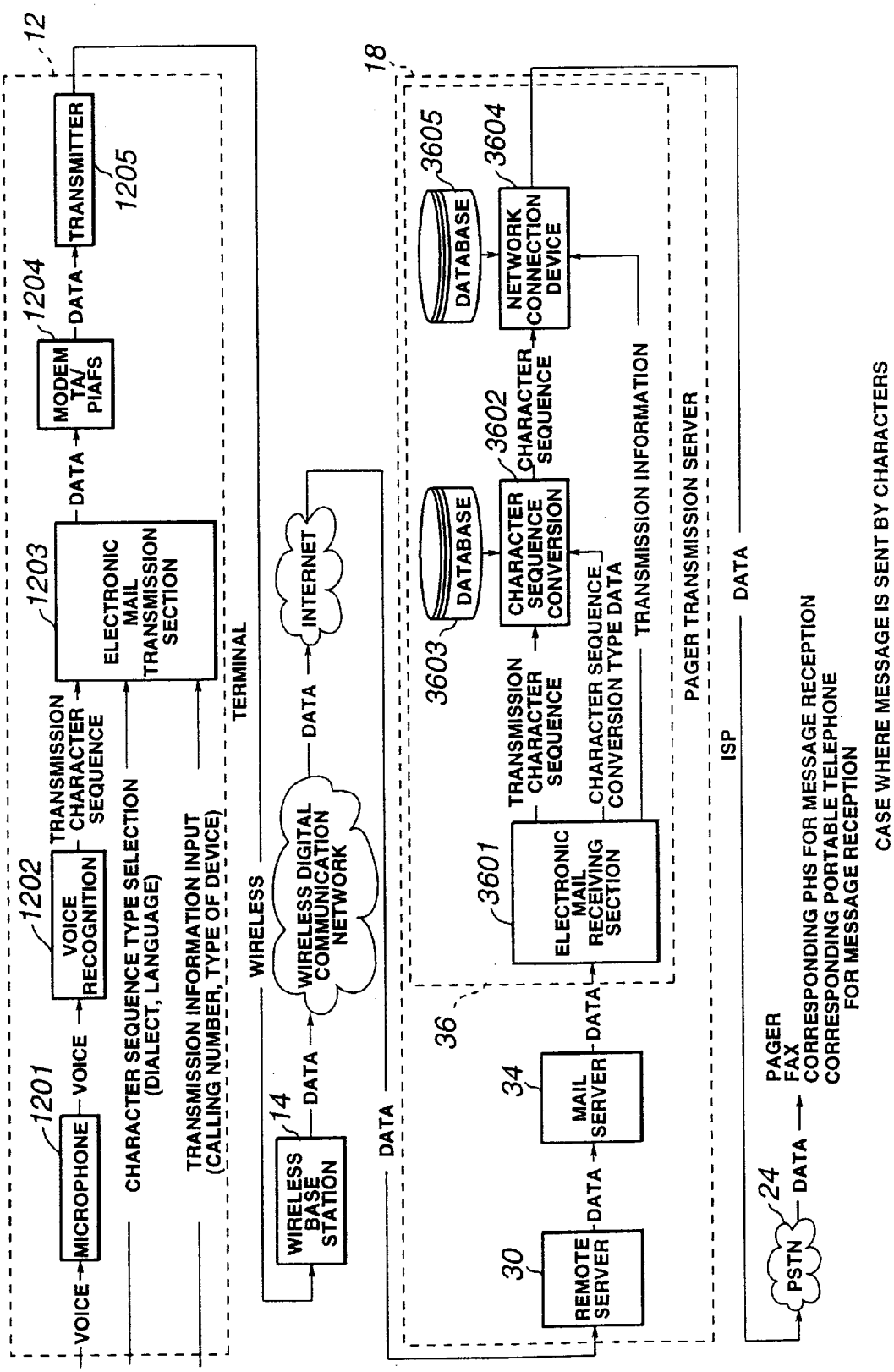
FIG. 3 is a block diagram showing the layout of a communication system according to a first embodiment of the present invention when a message is sent by characters.

FIG. 3 is a functional block diagram of the case where a message is sent by characters. The layout of terminal 12 is practically the same as in the case of FIG. 2, the difference lying in the fact that tone colour type selection information is not input to electronic mail transmission section 1203. This is because, in the case of characters, tone colour information cannot be applied.

In the case where a message is sent by characters, message information and its selection information received by provider system 18 through the transmission network are input to a pager transmission server 36 through remote server 30 and mail server 34. Pager transmission server 36 is practically the same as gateway server 32 of FIG. 2 but, in accordance with the fact that, as described in the case of FIG. 3, voice type selection information is absent, it does not perform voice synthesis/voice conversion processing.

Figure 4:
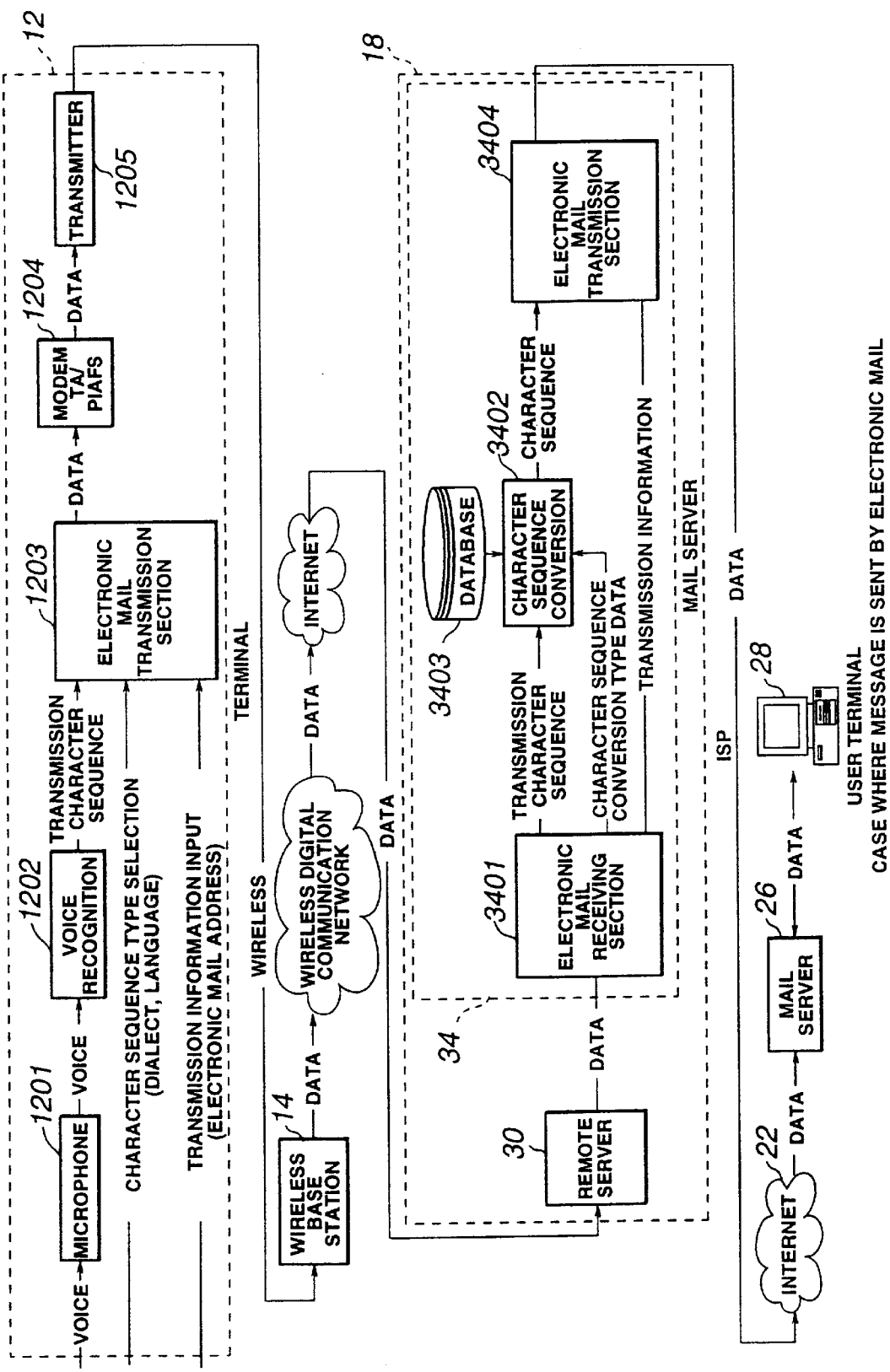
FIG. 4 is a block diagram showing the layout of a communication system according to a first embodiment of the present invention when electronic mail is sent.

FIG. 4 is a functional block diagram of the case of electronic mail transmission. It is the same as FIG. 3 in that tone colour type selection information is not input to electronic mail transmission section 1203 at terminal 12.

In the case of sending electronic mail, message information and its selection information that are received by provider system 18 through the communication network are not input to mail server 34 through remote server 30. A character sequence that has been subjected to a prescribed conversion by character sequence conversion section 3402 is sent to the Internet 22 by an electronic mail transmission section 304.

A brief description has been given of the operation of the communication system shown in FIG. 1~FIG. 4. As is clear from the above description, with this system, the output form at the receiving end can be selected at the transmission terminal end. Also, with this system, information designating the output form at the receiving end (electronic mail, voice mail, tone colour etc.) is sent by the message transmission end (terminal) and a message of prescribed form is output in accordance with the output form designation information at the receiving end (provider equipment). With this system, in the electronic mail or voice mail, a message can be output with conversion effected to emotional expression of its tone colour, feeling of tension, or mood and to expression of peculiarities such as dialect.

It should be noted that, in FIG. 1~FIG. 4, the reason for the provision of a voice recognition (voice data conversion) terminal at the terminal end is as follows. Since the data can be sent in compressed form, the connection time is shorter than if the voice data were sent without modification, and this is therefore more economic. Since transmission is effected bundled in electronic mail form, processing can be performed in a much shorter time than in the case where a voice recognition/conversion section for electronic mail compilation is provided in the server. In particular, since, in the case of this system, the output form at the receiving end (sound quality etc.) is determined by the sending terminal, the provision of a voice recognition/conversion section at the terminal is particularly important.

2. Explanation of the operation of the constituent elements of the system

Next, the operation of the elements constituting the system will be described.

PHS terminal 12 has the following functions.

(1) It is provided with a voice recognition function. Consequently, a keyboard or character input pad is unnecessary, making it possible to miniaturise the terminal.

(2) It is provided with an RCR STD28 function (second generation cordless telephone system reference standard).

(3) It is provided with a 32 kbps data communication function under PIAFS.

(4) It is provided with PPP and TCP/IP.

(5) It is provided with an SMPT function, so as to be capable of sending electronic mail.

Figure 5:
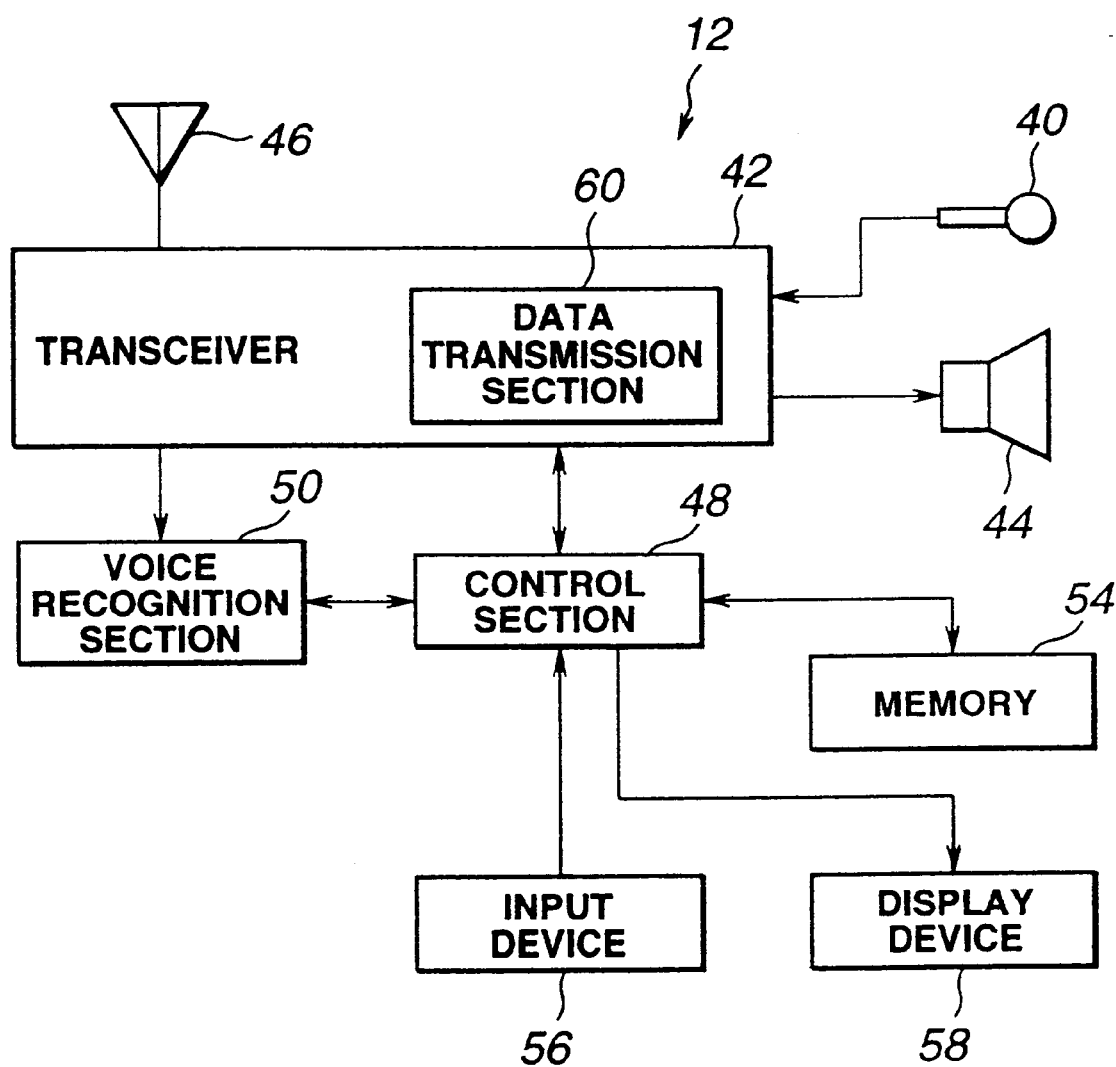
FIG. 5 is a block diagram according to a first embodiment illustrating the layout of a PHS terminal.

FIG. 5 is a block diagram showing the construction of a PHS terminal 12 according to a first embodiment in more detail. As shown in FIG. 5, PHS terminal 12 comprises: a microphone 40 that receives voice emitted by the user; a transceiver 42 that transmits voice signals etc. through antenna 46 or that receives these through the antenna; a speaker 44 that emits voice based on the voice signal that it receives; antenna 46; a control section 48 that controls the operation of PHS terminal 12 in accordance with the necessary program for PHS terminal 12; a voice recognition section 50 that specifies the emitted voice (character sequence) by recognising a voice signal applied to microphone 40; a memory 54 that stores the program and necessary data; an input device 56 comprising numeric keys and various function keys; and a display device 58 comprising LCDs.

Voice recognition section 50 recognises a voice signal that it receives and specifies the character sequence constituting the voice. Also, control section 48 analyses the recognised character sequence and analyses the structure of this character sequence, and then performs a selected conversion on the character sequence to thereby compile a converted character sequence. It should be noted that the character sequence conversion section could be provided either at the terminal or at the server. As will be described, in this embodiment, this conversion may include: (1) conversion to a corresponding dialect; (2) conversion to an intonation and/or manner of speaking mimicking a celebrity or cartoon character; (3) conversion to a designated modulation; or (4) translation.

Of these, in order to implement (2) or (3), the techniques disclosed in for example Early Japanese Patent Publication No. H.2-106799 and/or Early Japanese Patent Publication No. H.2-236600 may be employed. Also, in order to implement (1), a prescribed conversion table may be provided in memory 54, as will be described.

Operation of a PHS terminal 12 constructed in this way is described in more detail below. Normally, at PHS terminal 12, voice signals supplied to the microphone by a user are sent by means of transceiver 42 through an antenna to the PHS base station 14 and are further transmitted through this base station 14 to the subscriber telephone of an address (dialling number) that was previously input, or to a PHS terminal etc. Also, when voice signals from PHS base station 14 are received by transceiver 42, the corresponding voice is emitted from speaker 44.

In this way, apart from ordinary speech, a PHS terminal 12 according to this embodiment can transmit through provider system 18 the following various types of information.

Specifically, (A) voice can be transmitted through the gateway server 32 for telephony to other subscriber telephones, PHS terminals or portable telephones. (B) Electronic mail can be transmitted to a user terminal 28 through a mail server 34. (C) Prescribed messages can be transmitted through a pager transmission server 36 to a pager, portable terminal capable of message reception, or to a fax etc.

Consequently, apart from ordinary speech mode, a PHS terminal 12 for transfer of information by the above three paths can operate in accordance with any of the following: a mode for transmitting voice using a telephony gateway server (hereinbelow called "voice mode"); a mode for performing transfer of electronic mail (hereinbelow called "mail mode") and a mode for performing transfer of messages (hereinbelow called "message mode").

Also, under voice mode, as described above, voice emitted by the user can be (1) converted to a corresponding dialect (2) converted to a mimicked intonation and/or imitated voice or (3) the modulation thereof may be converted. Likewise, under mail mode or message mode, the voice emitted by the user can be used to (1) compile mail converted to a corresponding dialect.

(A) Operation of a PHS terminal under voice mode and a provider system in response thereto First of all, the operation of a PHS terminal etc. under voice mode will be described. FIG. 6 is a flow chart showing the processing which is executed under voice mode. The processing of FIG. 6 is actuated by operation of a mode setting key (not shown) in input device 56. First of all, the user utters a desired character sequence (phrase) towards microphone 40 (step 301). Voice that is generated by this user is transferred to voice recognition section 50 and voice recognition section 50 and voice recognition section 50 recognises the input voice and specifies (step 302) characters and/or numerals constituting this character sequence (phrase). The information relating to the specified characters and/or numerals is stored in a prescribed region of memory 54 by control section 48.

Next, the user designates emotion information indicating the modulation of the voice that is to be sent (step 303) by operating prescribed function keys (not shown) of the input device 56. In this embodiment, the modulation includes "anger", "joy", "sadness", "threatening" and "fear".

The method of expressing motion in voice will now be described. According to a published reference: Katsuki Okamoto et al "Study of Extraction of Audio Characteristics Expressing Basic Motions", Article No. SA-6-3 of the Electronic Information Communication Association of Japan Spring Congress, 1993, the elements expressing emotion in voice include time structure, acoustic pressure, pitch period, and spectrum envelope. As a result of analysis for each vowel of speech under the emotions "sadness", "no emotion", "threat", "joy" or "anger", it is found that, in the case of anger and joy, the pitch period becomes shorter than in the case of no emotion, the changes for the individual vowels being very similar. Also, in the case of sadness, the pitch period is longer than in the case of no emotion and the fluctuations of the individual vowels are few. Also, as a result of analysis of the total vowel interval, it is found that, while anger and joy show similar pitch periods, in the case of anger the effect of higher harmonic components is more pronounced. These results are summarised in FIG. 5 of this article. Specifically, if high-frequency power and pitch period are taken as characteristic quantities, "sadness" has the lowest high frequency power and longest pitch period. In contrast, "anger" has the highest high frequency power and shortest pitch period. "No emotion", "threat" and "joy" come between these. Roughly speaking, "sadness", "no emotion", "threat", "joy" and "anger" are arranged in that order in the high-frequency power/pitch period plane. Consequently, in order to express emotions in synthesised voice, for example high frequency power and pitch period may be suitably selected in accordance with the emotion as described above.

After this, the user may specify (step 304) dialect/imitation information indicating the dialect and mimicked intonation/imitation of the voice to be transmitted, by again operating a function key (not shown). In this example, the dialect includes "Kansai dialect", "Kyoto dialect", "Tokyo dialect" and "Tohoku dialect" while the intonation/imitation includes intonation/imitation of celebrities, or intonation/imitation of cartoon characters.

Also, in addition to the technique described above, dialect can be implemented using a conversion table provided in memory 54.

For dialect, there is provided in memory 54 a dialect conversion table in which are stored the expressions in each dialect corresponding to dialogue items in standard Japanese. For example, corresponding to the dialogue item "Arigato Gozaimasu" [Thank you], data expressing the phrase "Maido Ooki" [Thank you] in the Kansai dialect is stored. Also, regarding imitated speech, in memory 54 there is stored for each phoneme voice data of a celebrity or cartoon character.

Using the data stored in memory 54, the converted voice is temporarily stored in another prescribed region of memory 54 by control section 48. Next, data transmission section 60 in transceiver 42 is actuated by the user specifying the transmission destination (step 306) and designating transmission, and the voice (voice data) that is read from the other prescribed region in memory 54 by control section 48 is supplied to data transmission section 60 and this is transmitted by data transmission section 60 through antenna 46 to PHS base station 14 (step 307). It should be noted that the data that is sent, apart from the main body of the voice data, has attached to it a header indicating that it constitutes voice (i.e. that it is data compiled under voice mode).

Also, in step 306, the transmission time can be designated. In this case, step 307 is executed at the designated time. Also, in step 306, it would be possible to designate the priority of the information that is to be sent. For example, transmission to transmission server 18 may be effected by setting up four priority levels (1: maximum priority, 2: priority, 3: normal, 4: any time) and attaching these to the data. In this case, the transmitting server, when voice is to be sent to a destination PHS terminal etc., may first of all send this priority level to the remote party.

PHS base station 14 sends data that has been accepted through circuit network 16 to provider system 18. In provider system 18, data is first of all accepted by remote server 30 and then sent to mail server 34. Mail server 34 checks the data header and if it finds that this constitutes date compiled under voice mode, in accordance with this determination, sends the data to telephony gateway server 32. In response to this, telephony gateway server 32 sends the data (voice data) with which it has been supplied to the destination subscriber telephone, PHS terminal or portable telephone.

In this way, voice that has been compiled by PHS terminal 12, altered in respect of modulation and/or intonation/imitation and/or converted to a corresponding dialect is sent to another subscriber telephone, PHS terminal or portable telephone through provider system 18.

B) Operation of the PHS terminal under mail mode and of provider system in response thereto Examples in which conversion of characters is performed at the terminal or server are described below.

Next, a description of the operation of a PHS terminal etc. under mail mode will be given. FIG. 7 is a flow chart showing the processing executed under mail mode. The processing of FIG. 7 is actuated by operation of a mode setting key (not shown) in input device 56. In FIG. 7, the processing of steps 401 and 402 respectively corresponds to the processing of step 301 and 302 in FIG. 6 so a description thereof is omitted. After the characters and/or numerals constituting the character series (phrase) corresponding to the input voice have been specified, the user operates a function key (not shown) to specify the dialect into which the voice that is to be sent is to be converted (step 403). Under this mail mode, just as in the case of voice mode, for example the dialects "Kansai dialect", "Kyoto dialect", "Tokyo dialect", or "Tohoku dialect" are available.

When specification of the dialect in step 403 has been completed, control section 48, by referring to the dialect conversion table in memory 54, converts the relevant dialogue item into the corresponding dialect (step 404). When conversion of the character sequence has been completed, the user designates the transmission destination and designates transmission (steps 405, 406). The processing of these steps 405 and 406 respectively correspond to the processing of steps 306 and 307 of FIG. 6, so a detailed description is omitted. Apart from the main body of the data of the character sequence, the data to be sent also has added to it a header indicating that it constitutes mail (i.e. that the data was compiled in mail mode).

PHS base station 14 sends the accepted data through circuit network 16 to the provider system 18. In provider system 18, first of all, remote server accepts the data and then sends it to mail server 34. Mail server 34 checks the header of the data and concludes that this is that of data compiled under mail mode; in accordance with this conclusion, user terminal 28, which is the destination of the mail, receives the mail that was accepted by mail server 26; the character sequence compiled by PHS terminal 12 can thereby be received.

In this way, voice compiled by PHS terminal 12 and converted into a corresponding dialect is transmitted to another user terminal 28 through provider system 18. It should be noted that transmission time and priority level could be set in step 405 in the same way as in the case of voice mode.

C) Operation of PHS terminal under message mode and provider system in response thereto Next, the operation of a PHS terminal under message mode will be described. The processing of a PHS terminal under this mode is practically the same as that shown in FIG. 7. Specifically, apart from the main body of the data of the message, a header indicating that this is a message (i.e. that the data was compiled under message mode) is added to the transmitted data.

PHS base station 14 that has accepted data from PHS terminal 12 sends the data that it has accepted to provider system 18 through circuit network 16. In provider system 18, first of all, the data is accepted by remote server 30 and transmitted to mail server 34. Mail server 34 checks the data header and concludes that this is data compiled under message mode and, in accordance with this conclusion, sends the data to pager transmission server 36. Pager transmission server 36, in response to this, sends the data (message) with which it has been supplied to the pager constituting the destination. Of course, just as in the case of the other modes, message mode could be set up such that the transmission time and priority level are set at the PHS terminal so that provider system 18 can operate in accordance therewith.

3. Operating example

In order to facilitate understanding of the present invention, an example of processing including an operating example is indicated.

(Processing at the terminal)

(1) First of all, the user of the terminal registers beforehand the following information at the PHS terminal.
   Telephone number of the PPP connection point
   PPP account name: account name required when effecting PPP connection
   PPP password: password required when affecting PPP connection
   User: name of user for purposes of authenticating the user of this service
   Pass: password for purposes of authenticating the user of this service
   Mail1: Electronic mail address of transmission report destination when transmission has succeeded. This must be designated in order for a report to be made when transmission has succeeded. Also, if it is omitted, mail cannot be sent.
   Mail2: Electronic mail address of transmission report when transmission fails. This must be designated in order for a report to be made when transmission fails. Also, when omitted, mail cannot be sent.

(2) The user puts the PHS terminal in voice recognition mode (3) The user speaks to the PHS terminal (corresponding to S301 above).

(4) The user stops the voice recognition mode of the PHS terminal.

(5) The speaker is digitally recorded at the PHS terminal, voice recognition is performed, and conversion to characters is effected (corresponding to S302 above). These characters are held within the terminal as a message.

(6) After the user has indicated the following information to the PHS terminal, transmission is designated.
   Number: the telephone number of the sending terminal is written.

As an exception, if type 1 is mail, the destination of the electronic mail is written (example: isao@xxx.yy.jp).

Type1: Designation of sending address. This may be by any of the following.
      Voice: Voice (to Telephony Gateway Server 1 (corresponding to Gateway Server 32)).

Mail: Electronic mail (to Mail Server 1 (corresponding to Mail Server 34)).

Message: Message transmission

Type2: This consists in a specification of type1 in more detail.

It may be in accordance with any of the following.

When type1 is voice: voice is specified. For example the voice of a cartoon character.

When type1 is mail: not specified.

When type1 is a message: the pager type, fax, type of portable telephone, or PHS operator is specified.

Password: This is specified when a password is set at the terminal. It can be omitted.

Priority: the priority level of the message to be sent is written. For example this could be any one of 1: maximum priority, 2: priority, 3: normal, 4: any time.

Data1: When type1 is voice, data relating to emotion information is designated. For example, this can be any of anger, joy, threat, fear, or normal (corresponding to the above S303).

Data2: Data regarding dialect (example: Kansai dialect) or peculiarities (for example: catch-phrases of a famous person) is designated (corresponding to the above S304). For example, this may be "Kansai".

Time: the transmission time is entered. 10 o'clock on 13 September is written as 09131000. If it is omitted, transmission is effected immediately.

(7) The PHS terminal effects connection to the remote server 30 using the PPP and TCP/IP function (corresponding to S306 above).

When this is done, the PPP account name and PPP password are employed.

(8) The above content is sent as electronic mail by the PHS terminal to the mail server 34 using SMPT (corresponding to S307 above).

The content of the electronic mail may be for example as shown in FIG. 8.

(Processing at mail server 1)

The mail server sends mail in accordance with the content of type1.

(1) When type1 is voice: the content of the incoming mail is sent to the prescribed destination address (Gateway Server 32).

(2) When type2 is mail: the content of the incoming mail is sent to the address designated in type2. The content of the mail is that designated by the message.

(3) When type3 is message: the content of the incoming mail is sent to the prescribed destination address (pager transmission server 36).

(Processing at Gateway Server)

(1) Mail as in FIG. 9 is sent from mail server 34.

(2) The "user" and "password" are checked to establish whether the user is genuine.

(3) When the time indicated by "time" is reached, the following processing is performed.

(4) The telephone number specified by "number" is dialled.

(5) [The procedure] waits until the telephone connection is made.

If, after calling N times, the remote party does not answer or the line is busy, redialling is effected after M minutes; if then after redialling P times connection is still not effected, a message is returned to the effect that transmission to the mail address designated in mail2 failed.

(6) The priority level designated by "priority" is reproduced by voice.

(7) The message designated by "message" is reproduced with the tone colour designated in type2. In the case of a kanji message, reproduction is effected after performing a kanji/kana character conversion.

(8) The voice reproduced in (7) is passed through a conversion filter corresponding to the emotion of data1. Such a filter can be implemented by a neural network or a DSP.

(9) The voice of (8) is reproduced by a speaker. After the reproduction has finished, the telephone connection is disconnected, and a message to the effect that sending has succeeded is returned to the mail address designated by mail1. If reproduction fails, a message to the effect that sending has failed is returned to the mail address designated by mail2. The tone colour specified in type2 is recorded beforehand in the server. An example of the format is shown in FIG. 12.

(Processing at mail server 2)

(1) Mail as in FIG. 10 is sent from the mail server.

(2) "User" and "password" are checked to establish the genuineness of the user.

(3) At the time designated by "time", the following operation is performed.

(4) Electronic mail is sent of which the main text is the content designated by "message", whose address is the content designated by "number". Also, information of priority level can be sent to the remote party by adding to the main text the sentence "priority level is ordinary".

(5) If transmission succeeds, a message to the effect that transmission has succeeded is returned to the mail address of mail1. If transmission fails, a message to the effect that transmission failed is returned to the mail address of mail2.

(Processing at the pager transmission server)

(1) Mail as in FIG. 11 is sent from the mail server.

(2) "User" and "password" are checked to establish the genuineness of the user.

(3) At the time indicated by "time", the following operation is performed.

(4) Main text whose content is designated by "message" is converted to the format of the device type specified by type2 and sent to the address whose content is indicated by "number". If at this point a password is specified by "password", the password is specified on sending.

(5) If transmission succeeds, a message to the effect that transmission has succeeded is returned to the mail address designated by mail1. If transmission fails, a message to the effect that transmission failed is returned to the mail address designated by mail2.

(Example of on-screen operation)

If the terminal has a display screen, it may be arranged for operation to be performed whilst viewing the screen. An example of operation using a screen is shown in FIG. 13–FIG. 17.

Figure 13:
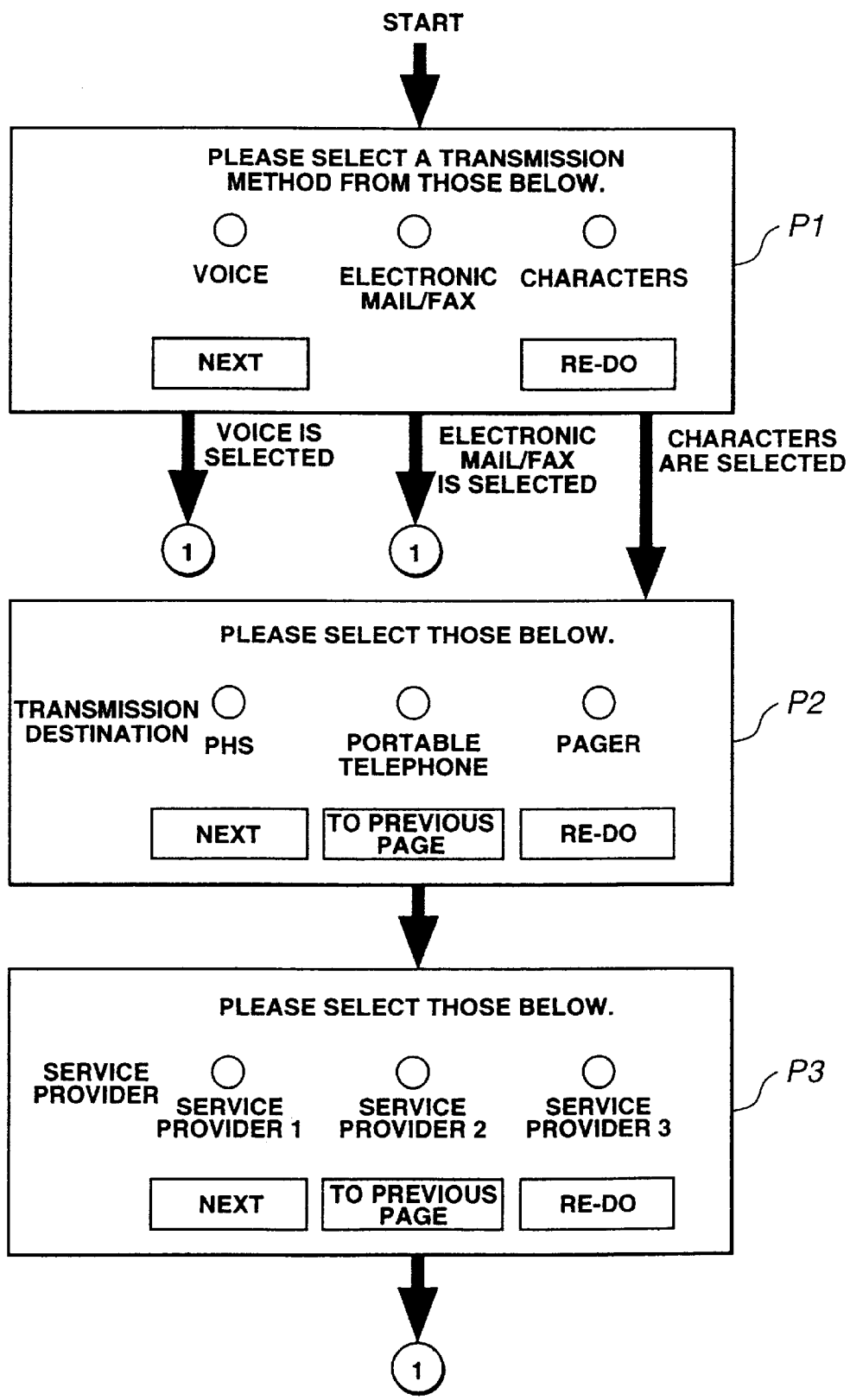
FIG. 13 is an operating example in accordance with the screen of a first embodiment of the present invention.

First of all, a selection is made as to whether transmission is to be performed by one or other of the methods: voice, electronic mail/fax, or characters (see screen P1 of FIG. 13). The selection is made by clicking using a pointer such as a mouse. This method of selection is also applied below. If the selection is to be re-done, "re-do" is clicked, then "next" is clicked.

If "characters" is selected, the transmission destination may be selected from one or other of PHS, portable telephone or pager (see screen P2 of FIG. 13). To re-do the selection, "re-do" is clicked, causing the preceding menu item to be re-selected, whereupon "to previous page" is clicked and then, next, "next" is clicked.

When the transmission destination is selected, a service provider is selected from one or other of service provider 1, service provider 2, or service provider 3 (see screen P3) of FIG. 13). It should be noted that the number of service providers may change depending on which of the above PHS, portable telephone or pager is selected. To re-do the selection, [the user] clicks on "re-do" and, when the previous menu item is again selected, clicks on "to previous page" then, next, clicks on "next". By means of this selection, restrictions may be imposed regarding the type of characters that may be input, limitation on the number of characters, or the types of set phrases etc.

Figure 14:
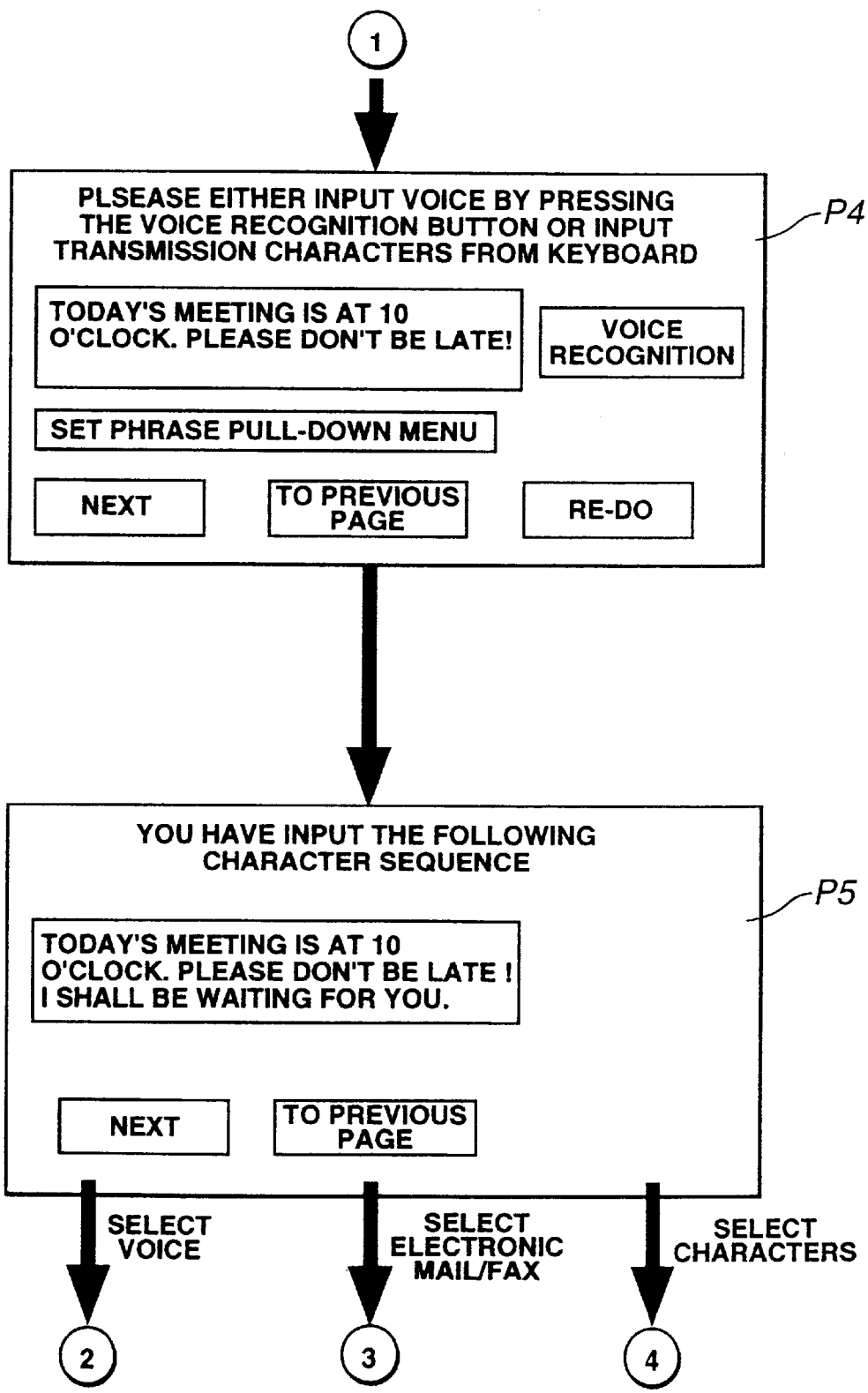
FIG. 14 is an operating example (continued) in accordance with the screen of a first embodiment of the present invention.

When a service provider is selected, or when voice or electronic mail/fax is selected in screen P1 of FIG. 13, next, a message is compiled (see screen P4 of FIG. 14). At this point, one or other of "voice recognition", "key input" or "menu" can be input. When a message is compiled by voice recognition, "voice recognition" is clicked and the voice that is to be transmitted is input. When this is done, the result of the voice recognition is displayed on the screen. On screen P4 of FIG. 14 the message "today's meeting is at 10 o'clock. Please don't be late!" is displayed. Also, this character series can be corrected using the keyboard. In the case of menu input, the user clicks on "set phrase pull down menu" on this screen, whereupon a plurality of set messages are displayed and a selection can be made by clicking on any one of these. To re-do, the user clicks on "re-do" and when the previous menu item is re-selected clicks on "to previous page", then, next, clicks on "next".

When the user clicks on "next", the message is evaluated and if there are any characters that cannot be input, a message to that effect is displayed, whereupon either the entire text must be re-input or just the portion that could not be input.

If the input message contains no characters that cannot be input, this character sequence is displayed on a subscreen (screen P5 of FIG. 14). If the previous menu item is re-selected, the user clicks on "to previous page" then, next, clicks on "next". When "next" is clicked, if voice is selected, [the procedure] advances to the screen of FIG. 15; if electronic mail/fax is selected, it advances to the screen of FIG. 16; and if "characters" is selected, it advances to the screen of FIG. 17, respectively.

If voice is selected, on the screen P6 of FIG. 15, emotion, tone colour and language/dialect can be selected. For "emotion" any of "normal", "anger", "joy", "sadness", "threatening", or "fear" can be selected. For "tone colour" any of "normal", or "tone colour 1"~"tone colour 4" can be selected. For "language/dialect", "normal", "English", "Chinese", "Tohoku dialect", or "Kansai dialect" can be selected. To re-do the selection, the user clicks on "re-do" and when the previous menu item is again selected, clicks on "to previous page" then, next, clicks on "next".

Next, the transmission priority level and transmission destination etc. are designated (see screen P7 of FIG. 15). There are five priority levels. The priority levels can be expressed by numbers or could be expressed by letters such as: Urgent, ASAP, Normal, For your review, or Please comment. The transmission destination number, the necessary password and the date and time of transmission are input from the keyboard. The password and date and time of transmission can be omitted; if the date and time of transmission are omitted, transmission is effected immediately. It is also possible to specify the contact point to be notified when the message sending succeeds or fails. To re-do the selection, the user clicks on "re-do" and when the previous menu item is re-selected, clicks on "to previous page" and when sending clicks on "send".

When electronic mail/fax is selected, emotion and language/dialect may be selected by screen P8 of FIG. 16. Emotion may be selected from normal, anger, joy, sadness, threat, or fear. Language/dialect may be selected from normal, English, Chinese, Tohoku dialect, or Kansai dialect. To re-do the selection, the user clicks on "re-do", and when the previous menu item is re-selected, clicks on "to previous page" and then, next, clicks on "next".

Next, the priority level and transmission destination etc. for the transmission are specified (see screen P9 of FIG. 16). This processing is identical with that described above, so a description thereof is omitted.

If "characters" is selected, screen P10 of FIG. 17 is displayed. The processing of screens P10 and P11 of FIG. 17 is the same as that in the case of electronic mail/fax, so a description thereof is omitted.

With this embodiment, the PHS terminal recognises the input voice and converts the recognised voice (or character sequence) into a prescribed form (for example, dialect, modulation, intonation/imitation) and sends the converted voice through a transmission server to another terminal (wireless terminal such as a PHS terminal, personal computer, pager or fax). In this way, the recognition rate of the voice can be improved since the sound quality of the input voice is guaranteed as the above processing is executed at the PHS terminal at the sending end. Also, since the processing such as conversion is executed at the PHS terminal at the sending end, the benefit is obtained that, compared with the case where conversion is effected by the provider system (server), authentication by the user is not necessary. Also, since the conversion processing is not performed at the provider system (server) end, PHS terminal service charges can be reduced.

Second Embodiment

Next, a second embodiment of the present invention will be described. In this embodiment, voice recognition and voice conversion are not performed at the PHS terminal but are executed at the provider system (server) end. Specifically, of the constituent elements of the PHS terminal of FIG. 5, the conversion section and associated table in memory 54 are provided at the transmission server 18.

In a system constituted in this way, the PHS terminal 12 performs processing as shown in FIG. 18(*a*) under all modes of (A) voice mode, (B) mail mode (C) message mode.

In FIG. 18(*a*), step 501 and step 502 correspond to step 301 and step 302 of FIG. 6, so a description thereof is omitted. After the characters and/or numerals constituting the character sequence (phrase) corresponding to the input voice have been specified, the user, by operating a function key (not shown) sets various types of information to be added to the information to be transmitted (step 503). As the information that may be set, apart from the setting of (A) voice mode, (B) mail mode or (C) message mode, when (A) voice mode is set, setting of emotion information, setting of dialect, and setting of intonation/imitation is included, while, when (B) mail mode or (C) message mode are set, setting of dialect is included. Also, at this point, transmission time and priority level may be set.

After the information as to the various means has been set, the user specifies the transmission destination and designates transmission (steps 504, 505). These steps respectively correspond to step 306 and 307 of FIG. 6, so detailed description thereof is omitted. At this point, in the transmitted data, apart from the data main text of the character sequence, there are provided a header indicating the set mode and/or various types of information (emotion information and/or dialect etc.).

Provider system 18, after accepting such data, performs the processing shown in FIG. 18(b). Specifically, the data of the accepted character sequence are converted to data of prescribed form in accordance with the various types of information that are added (step 511).

For example, if the header indicates that the mode is (A) voice mode, this is converted to voice data in accordance with the appended information (dialect, modulation, and/or intonation/imitation). Alternatively, if the header indicates that the mode is (B) mail mode or (C) message mode, this is converted into character sequence data in accordance with the appended information (dialect). After the data to be transmitted has thus been obtained, this is sent to the necessary destination, in accordance with the above mode, to telephony gateway 32, mail server 34 or pager transmission server 36 (step 512).

Although, in this embodiment, the conversion of voice and/or characters was effected at the transmission server end, since voice recognition is effected at the PHS terminal 12, an improved recognition rate can still be obtained just as in the case of the first embodiment.

Third Embodiment

Next, a third embodiment of the present invention is described. In this embodiment, when a message compiled by PHS terminal 12 is sent to another pager for example through the pager transmission server of provider system 18, PHS terminal 12 can transmit data taking into account the type of pager.

Figure 20:
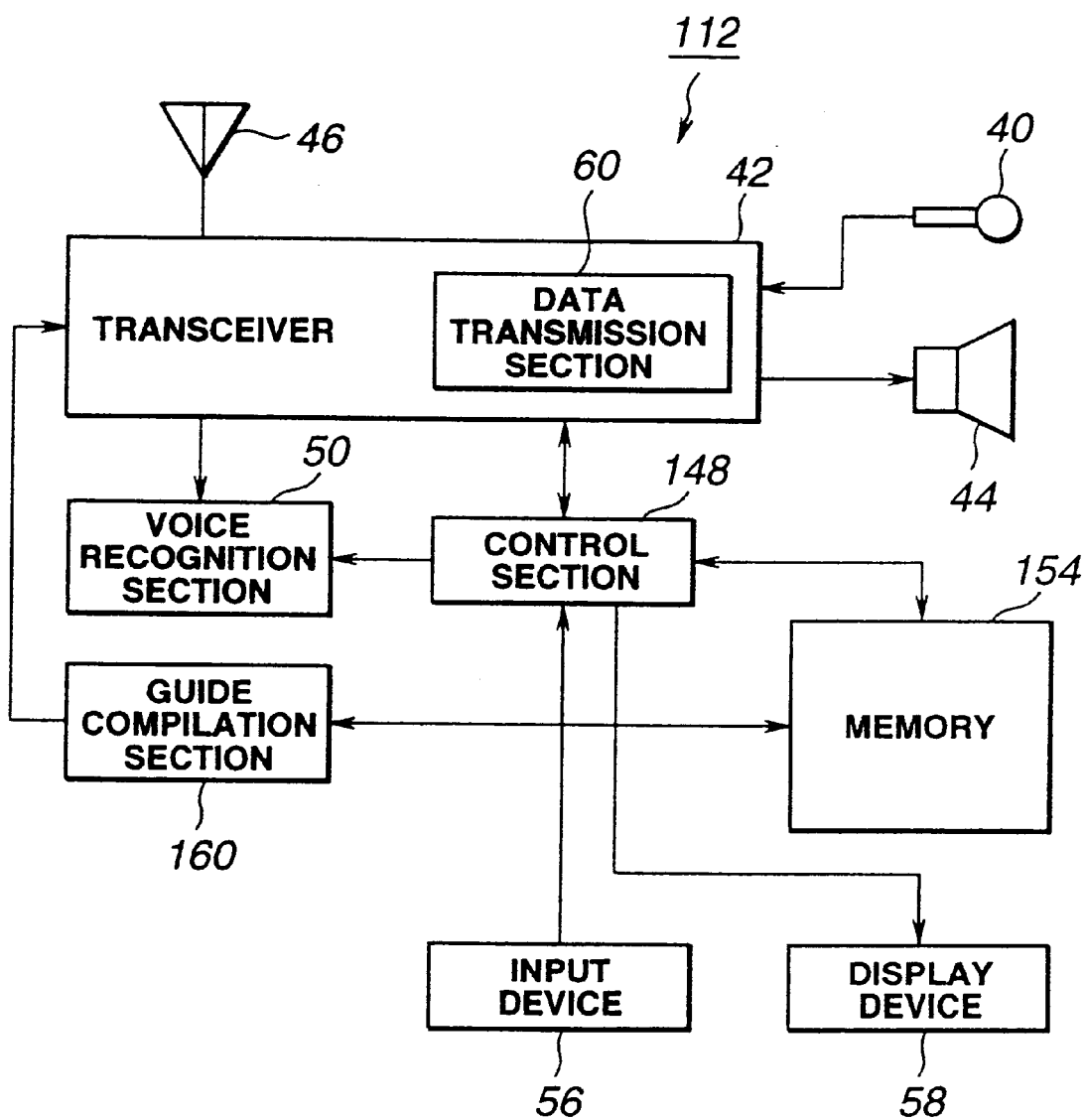
FIG. 20 is a block diagram showing the layout of a PHS terminal according to a third embodiment.

FIG. 19 is a block diagram showing the layout of a communication system according to the third embodiment; FIG. 20 is a block diagram showing the layout of a PHS terminal according to the third embodiment. In this embodiment, apart from ordinary speech, operation can be effected under (B) mail mode in which mail is transmitted and (C) message mode in which a message is transmitted to for example a pager. Of course, it would be possible to operate under (A) voice mode or (B) mail mode as in the first and second embodiments.

As shown in FIG. 19, transmission equipment 70~72 of various types of pager service providers can be connected through circuit network 24 to the pager transmission server 36 of provider system 18 belonging to this communication system 100. Also, pager 76 can receive data (messages) transmitted from the transmission equipment (for example reference numeral 70) of the corresponding pager service providers.

In FIG. 20, structural elements that are the same as in the case of the first embodiment are given the same reference numerals. PHS terminal 112 according to the third embodiment comprises, apart from microphone 40, transceiver 42, speaker 44, antenna 46, voice recognition section 50, input device 56 and display device 58, a control section 148 that controls the entire PHS terminal 12, a memory 154 that stores the program and, in addition, necessary data, and a guide compilation section 160 for compiling a guide for input purposes.

Figure 21:
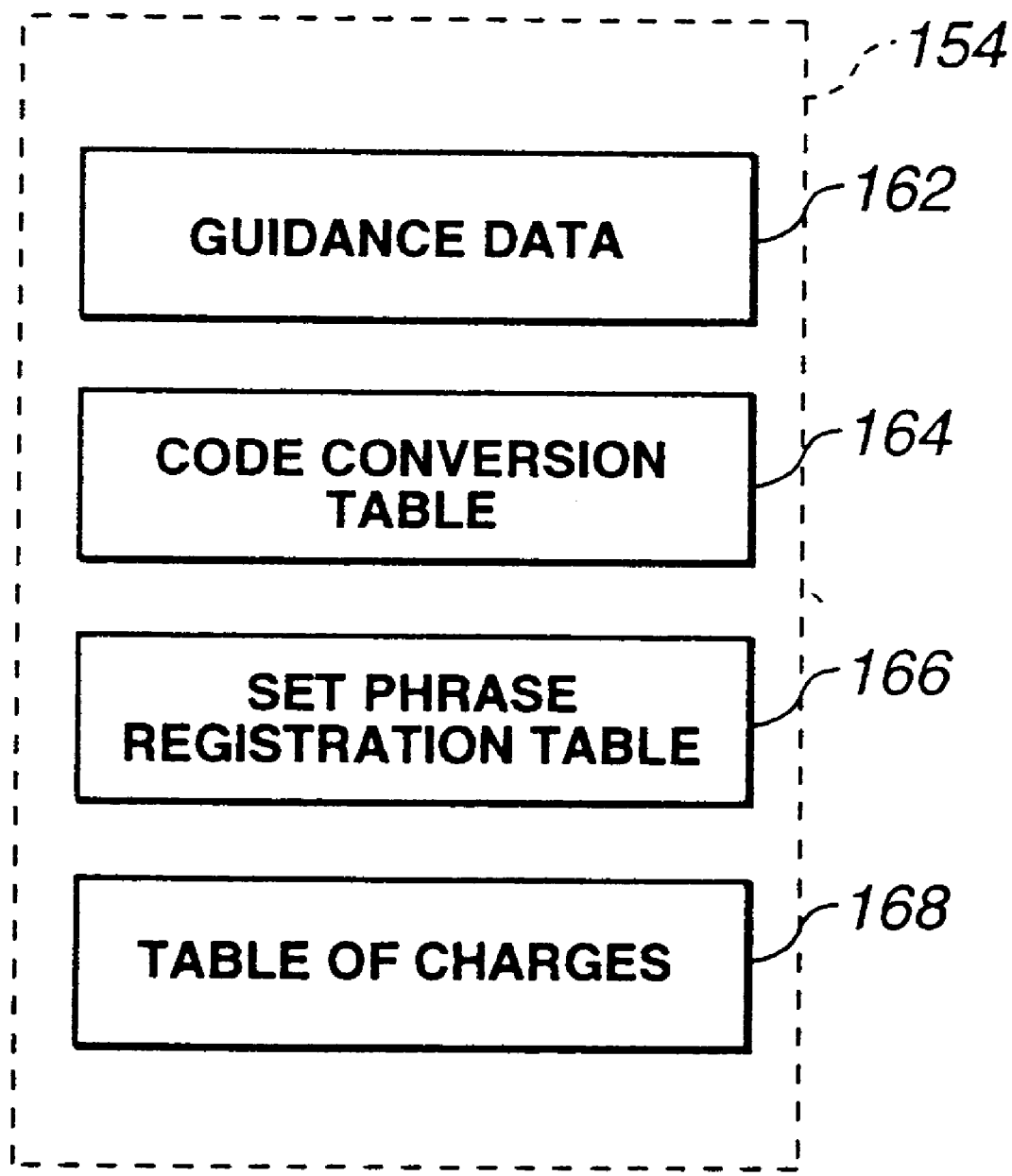
FIG. 21 is a view given in explanation of the data stored in memory according to a third embodiment.

FIG. 21 is a view given in explanation of the necessary data that is stored in memory. As shown in FIG. 21, memory 154 comprises: guidance data 162 corresponding to various types of guidance employed by guide compilation section 160; code conversion table 164 for converting characters or numerals input by voice into code matching the type of pager etc. at the transmission destination; and a set phrase registration table 166 in which are registered set phrases that have been set by the user.

The operation of a PHS terminal 112 constructed as above will now be described. FIG. 21(a) is a flow chart showing the operation of a PHS terminal 112 according to this embodiment. As shown in FIG. 22(a), guide compilation section 112 in PHS device 112 reads a prescribed one of the guidance data 162 in memory 154 and outputs the corresponding voice from speaker 44 (step 901). This guidance may consist for example of "Please input the message to be transmitted".

Next, the input voice is applied to voice recognition section 50 through control section 148. Voice recognition section 50 recognises the input voice and specifies the characters and/or numerals that constitute this character sequence (phrase) (step 902). In this way, in response to completion of specification of characters and/or numerals by voice recognition section 50, guide compilation section 160 outputs from speaker 44 a further guidance item (step 903). This guidance item is for purposes of setting various types of information. In this embodiment, these various items of information that are to be set include: the type of information that is to be transmitted (mail or message: corresponding to mail mode or message mode in the first embodiment); the type of device such as for example a pager that is the destination in the case of message transmission; the address of the transmission destination; the transmission time; and the priority level.

For example, when the above information is set, the following various items of guidance may be emitted from speaker 44: "To send mail, please press 1; To send a message, please press 2.", "Please specify the type of transmission destination device.", "Please specify the transmission time.", "Please input the destination address.".

When the various types of information have been set in accordance with this guide (step 904), control section 148 converts the characters and/or numerals specified in step 902 into prescribed code (step 905) in accordance with the type of device of the pager which is the destination in the case of message transmission.

It is known that characters and/or numerals can be encoded and transmitted by a pager or PHS terminal and can be displayed on the display of a destination pager or PHS terminal. However, the codes for the characters and/or numerals are different depending on the service provider and also on the type of device of the pager or PHS terminal.

As shown in FIG. 23, in code conversion table 164, a code corresponding to each service provider and type of device is associated with respective characters and numerals. For example, if the character sequence that is input to PHS terminal 112 and recognised by voice recognition is "AC" and the service provider corresponding to the destination pager is "service provider 1" and the type of device is "device type 2", the code after conversion becomes "A12 C12".

The code that is obtained in accordance with the service provider and type of device in this way is transmitted in response to designation of transmission by the user (step 906).

Provider system 18 refers to the received data header and, if this is mail, mail server 18 transfers the data to the mail server 26 corresponding to the transmission destination, through circuit network 22 or, if the received data is a message to be transmitted to a pager etc., pager transmission server 36 sends the message to equipment 70 of the corresponding pager service provider through circuit network 24 with a request that it be transferred to its destination. In this way, a message compiled by PHS terminal 112 is transferred to the destination pager 76.

In this way, with this embodiment, PHS terminal 112 converts a character sequence that was input using speech in accordance with the service provider and device type corresponding to the destination pager, and outputs the converted code. Consequently, even in the case where the service provider and/or type of device to which the PHS terminal 112 belongs are different from the service provider and/or type of device of the destination pager and/or PHS terminal, the necessary information can be appropriately transmitted.

Furthermore, with this embodiment, the user can himself register set phrases and, if these set phrases coincide with set phrases previously determined in accordance with the service provider or device type, can store this information.

FIG. 22(*b*) is a flowchart showing compilation and registration of set phrases by a PHS terminal 112 according to this embodiment. This processing is actuated by the user operating a prescribed function key (not shown) to set up for example "set phrase registration mode". When the user supplies to the microphone voice corresponding to the desired phrase, the characters and numerals constituting the character sequence corresponding to this voice are specified by voice recognition section 50 (step 911). Then, by means of the user inputting a numeral indicating the number of the set phrase by using a numerical key (not shown), the set phrase number and corresponding character sequence are stored in a prescribed region of memory 154.

In a pager or the like when, apart from codes that are determined for each character or numeral (the so-called free messages), particular codes and set phrases (messages) are predetermined, for example, the message "Please ring" may be pre-associated with the code "10".

In this embodiment, apart from the codes of each service provider and type of device corresponding to characters or numerals, code conversion table 164 stores codes for each service provider or type of device corresponding to set phrases (messages). Accordingly, the user can determine whether any of the registered set phrases correspond with set phrases (messages) for each service provider or type of device and, if they do correspond, can associate these with the set phrases of a given service provider or type of device, and store data indicating this correspondence in a prescribed region of memory 154 (step 912).

For example, if a user wishes to send a set phrase compiled by himself, after reading the corresponding phrase from set phrase registration table 166 of memory 154, control section 148 may execute the processing of steps 903 to 906 of FIG. 22(*a*). In this case, if the set phrase is associated with a given set phrase of the service provider or type of device corresponding to the destination pager, processing for code conversion (step 905) may be dispensed with.

In this way, with this embodiment, the user can compile a desired set phrase and register this; the convenience of the PHS terminal can thereby be increased.

The present invention is not restricted to the above embodiments and can be modified in various ways within the scope of the claims. Such modifications are of course included in the scope of the present invention.

For example, in the first embodiment, it would be possible to call directly another subscriber telephone, PHS terminal, or portable telephone, and to send voice converted in accordance with dialect, modulation, intonation/imitation.

Also, by providing a conversion section in accordance with the first embodiment at a PHS terminal according to the third embodiment, conversion based on dialect, modulation, intonation/imitation could be executed.

Furthermore, the present invention is not restricted to PHS terminals but could of course be applied to portable telephones and/or subscriber telephones. And apart from telephones it could be applied to so-called mobile terminals.

Also, although in the first and second embodiments, "modulation" includes "anger", "joy", "sadness", "threatening", and "fear", there is no restriction to this and expression of other emotions such as "teasing", or "flattery" could be included.

Furthermore, in this specification, "means" does not necessarily imply physical means and embraces the case where the functions of various means are implemented by software. Moreover the function of single means could be implemented by two or more physical means or the function of two or more means could be implemented by single physical means.

According to the present invention, it is possible to provide a communication system capable of transmitting desired information in accordance with conditions and/or the application.

Also, according to the present invention it is possible to provide a communication system capable of transmitting desired information independently of the type of device at the receiving terminal etc.

What is claimed is:

1. A communication system comprising:

at least one wireless communication terminal device and provider equipment capable of information transmission between itself and this wireless communication terminal device; wherein said wireless communication terminal device includes a transmission section that sends message information and selection information for selecting the form of output of said message information, and said provider equipment includes a processing section that outputs said message information in an output form in accordance with said selection information;

at least any one of selection of tone color, selection of modulation, selection of emotional expression of mood, selection of language and selection of dialect being selected by said selection information.

2. A communication system according to claim 1 wherein said wireless communication terminal device includes a transmission method selection section that selects one or other transmission method of voice, electronic mail, facsimile message or characters.

3. The communication system according to claim 1 wherein said wireless communication terminal device includes a transmission destination selection section that selects one or other transmission destination of Personal Handy Phone System, portable telephone or pager.

4. The communication system according to claim 1 wherein said wireless communication terminal device includes a priority level selection section that selects the priority level of said message information.

5. The communication system according to claim 1 wherein said wireless communication terminal device includes a transmission time selection section that designates the transmission time of said message information.

6. The communication system according to claim 1 wherein said wireless communication terminal device includes a transmission result receiving section that receives the result of transmission of said message information.

7. The communication system according to claim 1 wherein said provider equipment comprises an output form selection section that selects the output form of said message information in accordance with said selection information and a voice conversion section that effects conversion into voice of a selected output form; said output form selection section is constructed so as to select any of intonation or imitation of a prescribed celebrity and/or character; and said voice conversion section is constructed so as to effect conversion to a voice signal and/or character sequence signal with selected intonation or imitated voice.

8. The communication system according to claim 1 wherein said provider equipment comprises an output form selection section that selects the output form of said message information in accordance with said selection information and a voice conversion section that effects conversion into voice of a selected output form; said output form selection section is constructed so as to select any of modulations in accordance with prescribed emotions; and said voice conversion section is constructed so as to effect conversion to a voice signal of a selected modulation.

9. The communication system according to claim 8 wherein said modulation is based on any of the emotions: anger, joy, sadness, threat, and fear.

10. The communication system according to claim 8 wherein said voice conversion section changes any of the time structure of the voice, the acoustic pressure, the pitch period and the spectrum envelope in accordance with said modulation.

11. The communication system according to claim 8 wherein, if frequency power and pitch period are taken as the characteristic quantities, if said modulation is based on sadness, said voice conversion section effects conversion to a voice signal having low high-frequency power and long pitch period, and, if said modulation is based on anger, said voice conversion section effects conversion to a voice signal having high high-frequency power and short pitch period, and, if said modulation is based on any of no emotion, threat and joy, said voice conversion section effects conversion to a voice signal having high-frequency power and pitch period intermediate between said case of sadness and said case of anger.

12. The communication system according to claim 1 wherein said provider equipment comprises an output form selection section that selects the output form of said message information in accordance with said selection information and a voice conversion section that converts said message information into voice of a selected output form;

said output form selection section is constructed so as to select any of prescribed dialects; and said voice conversion section is constructed so as to effect conversion to a voice signal in accordance with a selected dialect.

13. The communication system according to claim 1 wherein said provider equipment comprises an output form selection section that selects the output form of said message information in accordance with said selection information and a character sequence conversion section that effects conversion to a character sequence of selected output form; said output form selection section is constructed to select any of a prescribed dialect and/or language; and said character sequence conversion section is constructed so as to effect conversion to a character sequence signal in accordance with the selected dialect.

14. A communication system comprising:

at least one wireless communication terminal device and provider equipment capable of information transmission between itself and this wireless communication terminal device; wherein said wireless communication terminal device includes a transmission section that sends message information and selection information for selecting the form of output of said message information, said provider equipment includes a processing section that outputs said message information in an output form in accordance with said selection information, and when ringing is effected with a special-purpose call tone from said wireless transmission terminal at a receiving terminal device, said wireless transmission terminal transmits call tone information.

15. A communication system comprising:

at least one wireless communication terminal device and provider equipment capable of information transmission between itself and this wireless communication terminal device; wherein said wireless communication terminal device includes a transmission section that sends message information and selection information for selecting the form of output of said message information, and said provider equipment includes:

a processing section that outputs said message information in an output form in accordance with said selection information, an output form selection section that selects the output form of said message information in accordance with said selection information;

a character conversion section that converts said message information to a character sequence of selected output form; a table whereby a correspondence is set up between characters and numerals, and/or set phrases and a code matching the sending party;

a code conversion section that refers to said table so as to be able to reproduce at the sending end of the characters, numerals and/or set phrases constituting the character series corresponding to said message information and converts these to a prescribed code; and a transmission section that transmits the converted code.

16. The communication system according to claim 15 wherein said provider equipment further comprises a second table that stores set phrases consisting of freely selectable character sequences.

* * * * *